(12) United States Patent
Kim et al.

(10) Patent No.: US 12,534,842 B2
(45) Date of Patent: Jan. 27, 2026

(54) USER TERMINAL AND CONTROL METHOD FOR SAME

(71) Applicant: Samsung Electronics Co., Ltd., Suwon-si (KR)

(72) Inventors: Ahhyun Kim, Suwon-si (KR); Jikyoung Kim, Suwon-si (KR); Kyoungae Lim, Suwon-si (KR); Jimin Hong, Suwon-si (KR); Kyungsoo Kim, Suwon-si (KR); Heejung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 289 days.

(21) Appl. No.: 17/743,051

(22) Filed: May 12, 2022

(65) Prior Publication Data

US 2022/0267939 A1    Aug. 25, 2022

Related U.S. Application Data

(63) Continuation of application No. PCT/KR2020/017044, filed on Nov. 27, 2020.

(30) Foreign Application Priority Data

Nov. 29, 2019    (KR) .................. 10-2019-0157750

(51) Int. Cl.
*D06F 34/05*    (2020.01)
*D06F 34/06*    (2020.01)
(Continued)

(52) U.S. Cl.
CPC .............. *D06F 34/05* (2020.02); *D06F 34/06* (2020.02); *D06F 34/32* (2020.02);
(Continued)

(58) Field of Classification Search
CPC .............................................. D06F 39/02–028
See application file for complete search history.

(56) References Cited

U.S. PATENT DOCUMENTS 8,429,026 B1 * 4/2013 Kolawa .................. G06Q 30/00
705/26.7
9,014,826 B2    4/2015 Yum et al.
(Continued)

FOREIGN PATENT DOCUMENTS

CN    107044031 A  *  8/2017  ............ D06F 33/00
KR    10-1994-0021810 A    10/1994
(Continued)

OTHER PUBLICATIONS

Korean Office Action dated Apr. 22, 2024, issued in Korean Application No. 10-2019-0157750.

*Primary Examiner* — Omair Chaudhri
(74) *Attorney, Agent, or Firm* — Jefferson IP Law, LLP

(57) ABSTRACT

An electronic device is provided. The electronic apparatus includes a memory in which an application is stored, a display, a position sensor, and a processor which executes the application to acquire user position information corresponding to a user terminal position sensed by the position sensor, and control a display to provide a user interface (UI) for controlling a cycle time of a washing apparatus, the UI being provided on the basis of information related to the cycle time of the washing apparatus and the user position information.

18 Claims, 27 Drawing Sheets

(51) Int. Cl.
  *D06F 34/32*   (2020.01)
  *D06F 101/14*   (2020.01)
  *G06Q 30/0601*   (2023.01)
  *H04W 4/02*   (2018.01)

(52) U.S. Cl.
  CPC ..... *G06Q 30/0631* (2013.01); *G06Q 30/0641* (2013.01); *H04W 4/025* (2013.01); *D06F 2101/14* (2020.02)

(56) References Cited

U.S. PATENT DOCUMENTS

| | | | |
|---|---|---|---|
| 9,531,860 B2 | 12/2016 | Yum et al. | |
| 9,739,004 B2 | 8/2017 | Ha et al. | |
| 9,801,009 B2 | 10/2017 | Shim et al. | |
| 9,951,451 B2 | 4/2018 | Park et al. | |
| 11,245,544 B2 | 2/2022 | Lee | |
| 2007/0107140 A1* | 5/2007 | Choi | D06F 34/10 68/3 R |
| 2010/0000023 A1* | 1/2010 | Mcallister | D06F 33/37 68/12.02 |
| 2010/0287709 A1* | 11/2010 | Doyle | D06F 33/32 68/12.18 |
| 2012/0110747 A1* | 5/2012 | Yum | A47L 15/0063 68/12.23 |
| 2013/0214935 A1* | 8/2013 | Kim | G08C 17/02 340/870.02 |
| 2014/0067131 A1* | 3/2014 | Park | D06F 34/05 700/275 |
| 2014/0070927 A1* | 3/2014 | Broniak | D06F 34/05 340/12.22 |
| 2015/0013074 A1* | 1/2015 | Ficke | D06F 34/05 8/137 |
| 2016/0215430 A1* | 7/2016 | Ha | H04L 12/282 |
| 2017/0079501 A1* | 3/2017 | Heiligenmann | A47L 15/4418 |
| 2017/0159221 A1* | 6/2017 | Cho | D06F 33/43 |
| 2018/0191518 A1 | 7/2018 | Shu et al. | |
| 2018/0305851 A1* | 10/2018 | Kwon | H04L 12/2825 |
| 2019/0106829 A1* | 4/2019 | Bueno | D06F 39/022 |
| 2019/0301068 A1* | 10/2019 | Kamiyama | D06F 33/70 |
| 2020/0004278 A1* | 1/2020 | Lee | G05D 23/1904 |
| 2020/0011005 A1* | 1/2020 | Okumura | F24D 15/00 |
| 2020/0240066 A1* | 7/2020 | Ko | D06F 34/32 |
| 2020/0248356 A1* | 8/2020 | Kwon | D06F 33/44 |
| 2020/0248361 A1* | 8/2020 | Bae | D06F 34/04 |
| 2020/0267251 A1* | 8/2020 | Cabaleiro Martins | H04L 12/282 |
| 2020/0378049 A1* | 12/2020 | Cooke | G06Q 30/0631 |

FOREIGN PATENT DOCUMENTS

| | | |
|---|---|---|
| KR | 10-0370088 B1 | 1/2003 |
| KR | 10-0479095 | 3/2005 |
| KR | 10-2010-0122030 A | 11/2010 |
| KR | 10-2013-0013236 A | 2/2013 |
| KR | 10-2014-0032262 A | 3/2014 |
| KR | 10-2015-0027643 A | 3/2015 |
| KR | 10-1563487 B1 | 10/2015 |
| KR | 10-2016-0143136 A | 12/2016 |
| KR | 10-2018-0016599 A | 2/2018 |
| KR | 10-2019-0065044 A | 6/2019 |
| KR | 10-2019-0087348 A | 7/2019 |
| KR | 10-2019-0107610 A | 9/2019 |

* cited by examiner

FIG. 3C

| LIFESTYLE CLASSIFICATION | RECOMMENDED COURSE |
|---|---|
| COMMON (5 BASICS) | STANDARD WASH, AUTO-CUSTOMIZED WASH (AUTOMATIC DISPENSING OF DETERGENT), SHIRTS, RINSING + SPIN DRYING, DETERGENT-FREE CONTAINER WASHING |
| SINGLE LIFE WITH TASTE | + WOOL/LINGERIE, FITNESS, SMALL AMOUNT RAPID, SUPER-ECONOMY WASH |
| BLISSFUL LIFE OF TWO | |
| NEAT LIFE WITH BABY | + BABY CLOTHES, BOIL WASH, SUPER-INTENSIVE WASH, BLANKETS, TOWELS |
| CLAMORING LIFE WITH FAMILY | + WOOL/LINGERIE, FITNESS, BLANKETS, TOWELS |
| MATURE SINGLE /COUPLE LIFE | + COTTON CLOTHES, BOIL WASH, OUTDOOR |

USER TERMINAL AND CONTROL METHOD FOR SAME

CROSS-REFERENCE TO RELATED APPLICATION(S)

This application is a continuation application, claiming priority under § 365(c), of an International application No. PCT/KR2020/017044, filed on Nov. 27, 2020, which is based on and claims the benefit of a Korean patent application number 10-2019-0157750, filed on Nov. 29, 2019, in the Korean Intellectual Property Office, the disclosure of each of which is incorporated by reference herein in its entirety.

BACKGROUND

1. Field

The disclosure relates to a user terminal and a control method for same. More particularly, the disclosure relates to a user terminal which controls an external device by executing an application and a control method for same.

2. Description of Related Art

Electronic devices of various types are being developed and supplied with the development of electronic technology. In particular, home appliances used in the home have in the recent years been under continuous development to satisfy needs of users.

Recently, various methods are being supplied to control home appliances within the home through applications installed in smart phones. However, there has been the problem of control methods on devices providing wash related functions such as a washer, a dryer, and an air dresser not being variously supplied.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a user terminal providing a user interface (UI) to control a device associated with washing through an application based on a user position and cycle information of device associated with washing and a control method for same.

Additional aspects will be set forth in part in the description which follows and, in part, will be apparent from the description, or may be learned by practice of the presented embodiments.

In accordance with an aspect of the disclosure, a user terminal is provided. The user terminal includes a memory stored with an application, a display, a position sensor, and a processor configured to obtain, by executing the application, user position information corresponding to a position of the user terminal sensed by the position sensor, and control the display to provide a user interface (UI) for controlling a cycle time of a washing machine based on information associated with the cycle time of the washing machine and the user position information.

The processor may be configured to control the display to provide a UI asking whether to change a preset cycle time of the washing machine based on the preset cycle time of the washing machine and the user position information.

The processor may be configured to control the display to provide a UI asking whether to perform an additional cycle in the washing machine based on a remaining cycle time of the washing machine and the user position information.

The processor may be configured to control the display to provide a UI which includes a plurality of lifestyle items, and control, based on one from among the plurality of lifestyle items being selected, the washing machine to automatically set a washing course corresponding to the selected item.

The processor may be configured to control the display to provide a UI for editing the washing course.

The processor may be configured to control the display to provide a UI which includes a remaining amount of detergent based on a number of washing cycles, an amount of detergent used when washing, and a current amount of detergent received from the washing machine.

The processor may be configured to control, based on the remaining amount of detergent reaching below a threshold value, the display to provide a UI which guides a purchase of detergent.

The UI which guides the purchase of detergent may include link information to a detergent purchasing website, and the processor may be configured to update the remaining amount of detergent based on detergent purchase information received from the detergent purchasing website.

The processor may be configured to control the display to provide a UI which includes an item for setting whether to maintain remote control of the washing machine, and maintain, based on being set to maintain the remote control on the UI, remote control of the machine regardless of completing a cycle of the washing machine.

The processor may be configured to control, based on identifying that an amount of detergent remaining in an automatic detergent dispenser provided in the washing machine is less than or equal to a threshold value and cleaning of the automatic detergent dispenser is necessary, the display to provide a UI which guides an insertion of detergent and a cleaning of the automatic detergent dispenser.

In accordance with another aspect of the disclosure, a control method of a user terminal controlling a washing machine by executing an application is provided. The control method includes obtaining user position information corresponding to a position of the user terminal sensed by a position sensor, and providing a user interface (UI) for controlling a cycle time of the washing machine in an execution screen of the application based on information associated with the cycle time of the washing machine and the user position information.

The providing the UI may include providing a UI asking whether to change a preset cycle time of the washing machine based on the preset cycle time of the washing machine and the user position information.

The providing the UI may include providing a UI asking whether to perform an additional cycle in the washing machine based on a remaining cycle time of the washing machine and the user position information.

The method may further include providing a UI which includes a plurality of lifestyle items, and controlling, based on one from among the plurality of lifestyle items being selected, the washing machine to automatically set a washing course corresponding to the selected item.

The method may further include providing a UI for editing the washing course.

The method may further include providing a UI which includes a remaining amount of detergent based on a number of washing cycles, an amount of detergent used when washing, and a current amount of detergent received from the washing machine, and providing, based on the remaining amount of detergent reaching below a threshold value, a UI which guides a purchase of detergent.

The UI which guides the purchase of detergent may include link information to a detergent purchasing website, and the control method may further include providing a UI which updates the remaining amount of detergent based on detergent purchase information received from the detergent purchasing website and includes information on the updated amount of detergent.

The method may further include providing a UI which includes an item for setting whether to maintain remote control of the washing machine and maintaining, based on being set to maintain the remote control on the UI, remote control of the machine regardless of completing a cycle of the washing machine.

The method may further include providing, based on identifying that an amount of detergent remaining in an automatic detergent dispenser provided in the washing machine is less than or equal to a threshold value and a cleaning of the automatic detergent dispenser is necessary, a UI which guides an insertion of detergent and the cleaning of the automatic detergent dispenser.

In accordance with another aspect of the disclosure, a non-transitory computer readable medium storing a computer instruction for the user terminal to perform an operation based on being executed by a processor of the user terminal is provided. The operation includes obtaining user position information corresponding to a position of the user terminal sensed by a position sensor and providing a UI for controlling a cycle time of the washing machine in an execution screen of an application based on information associated with the cycle time of the washing machine and the user position information.

According to the various embodiments described above, because a UI screen capable of controlling a washing machine is provided taking into consideration a user position and a cycle progress status (or a preset cycle time) of a washing machine (or, drying machine), user convenience is enhanced. In addition, because various guides associated with the control of the washing machine are provided, the user convenience is enhanced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A, 3B, and 3C are diagrams illustrating a UI screen according to various embodiments of the disclosure;

Throughout the drawings, it should be noted that like reference numbers are used to depict the same or similar elements, features, and structures.

DETAILED DESCRIPTION

Figure 1:
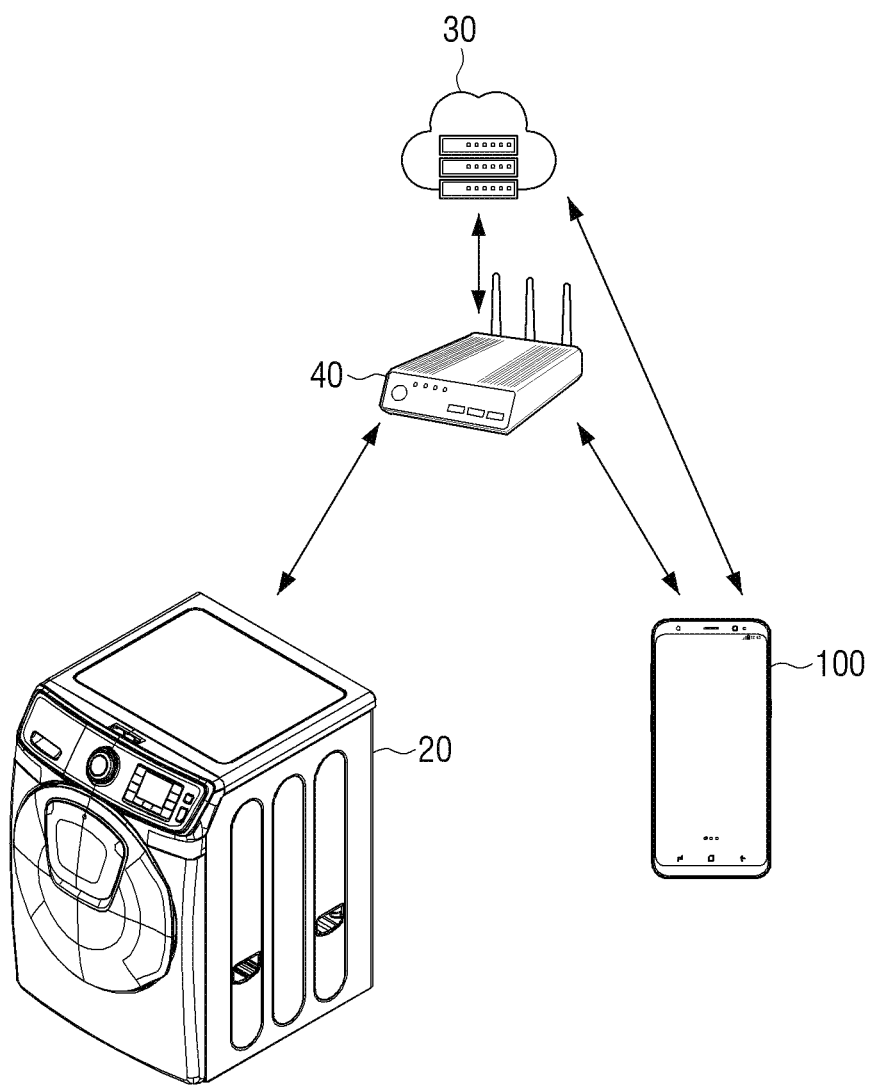
FIG. 1 is a diagram illustrating an electronic system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the embodiments of the disclosure are general terms that are currently widely used and identified in consideration of the functions in the disclosure. However, these terms may vary depending on intention, legal or technical interpretation, emergence of new technologies, and the like of those skilled in the related art. In addition, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "comprise," "may comprise," "include," "may include," or the like are used to designate a presence of a corresponding characteristic (e.g., elements such as numerical value, function, operation, or component, etc.), and not to preclude a presence or a possibility of additional characteristics.

Expressions such as at least one of A and/or B is to be understood as indicating any one of "A" or "B" or "A and B."

Expressions such as "first," "second," "1st," "2nd," or so on used herein may be used to refer to various elements regardless of order and/or importance, and it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to another element or as being coupled through other element (e.g., third element).

A singular expression includes a plural expression, unless otherwise specified. It is to be understood that the terms such as "comprise" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The terms "module" or "part" used in the embodiments herein perform at least one function or operation, and may be implemented with a hardware or software, or a combination of hardware and software. In addition, a plurality of "modules" or a plurality of "parts," except for a "module" or a "part" which needs to be implemented to a specific hardware, may be integrated to at least one module and implemented in at least one processor (not shown).

An embodiment of the disclosure will be described in greater detail below with reference to the accompanied drawings.

FIG. 1 is a diagram illustrating an electronic system according to an embodiment of the disclosure.

Referring to FIG. 1, a system 1000 may include a user terminal 100, a device subject to control 20, and a server 30.

The device subject to control 20 may be various Internet of Things (IoT) devices controllable through an application installed in the user terminal 100. According to an embodiment, the device may be implemented as a device performing various functions associated with washing such as a washer which performs washing of laundry using water and detergent, and spin drying of wet laundry, a dryer which performs drying of clothing, and the like, and an air dresser. However, the device performing various functions associated with laundry will be designated below as a "washing machine (or device associated with washing)" for convenience of description.

The server 30 may control and manage various devices (e.g., home appliances, IoT devices, etc.) which are registered in the server 30. At this time, the server 30 may register devices for each user account. Here, the server 30 may be implemented as a cloud server, but is not limited thereto.

The user terminal 100 may download and install an application from a server (not shown) which provides the application. In this case, the user may execute the application from the user terminal 100 and input the user account, and log-in to the server 30 through the input user account, and the user terminal 100 may perform communication with the server 30 based on the logged-in user account.

The user terminal 100 may perform communication with the washing machine which operates in an access point (AP) mode, and transmit information on the access point 40 (i.e., Wi-Fi access point) to the washing machine. For example, the user terminal 100 may display a list on connectable access points in a display of the user terminal 100, and transmit information on the access point 40 selected according to a user command on the list to the washing machine.

The washing machine may perform communicative connection with the access point 40 by using information on the access point 40 received from the user terminal 100, and connect to the server 30 through the access point 40. Accordingly, the server 30 may register a washing machine to a logged-in user account based on the washing machine being connected through the access point 40.

Based on the washing machine being registered to the user account, the server 30 may transmit data received from the washing machine to the user terminal 100 performing communication with the server 30 based on the user account to which the washing machine is registered. In addition, the server may transmit, based on a control command on the washing machine being received from the user terminal 100, the received control command to the washing machine. In this case, the user terminal 100 implemented as a smartphone, a tablet, and the like may connect to the server 30 through the access point 40, or connect to the server 30 through a mobile communication network such as long term evolution (LTE) or 5th generation (5G) and transmit the control command on the washing machine to the server 30 through the application installed in the user terminal 100.

Below, various user interface (UI) screens provided through the application installed in the user terminal 100 will be described according to various embodiments.

Figure 2:
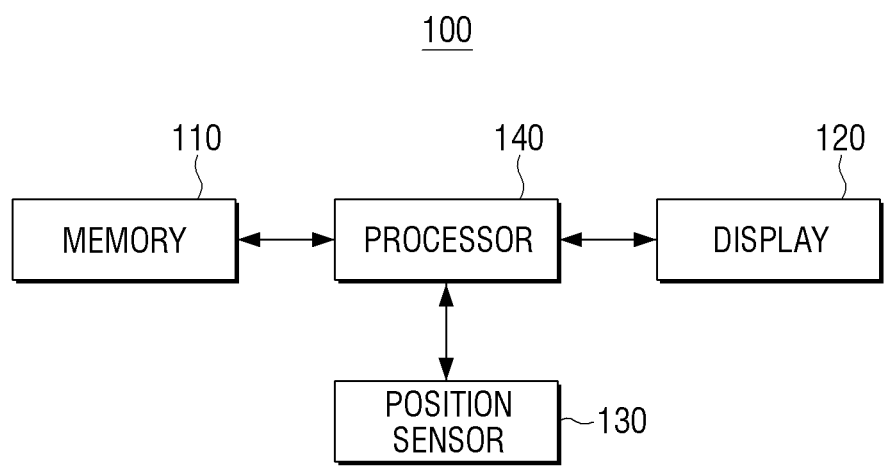
FIG. 2 is a block diagram illustrating a configuration of a user terminal according to an embodiment of the disclosure.

FIG. 2 is a block diagram illustrating a configuration of a user terminal according to an embodiment of the disclosure.

Referring to FIG. 2, the user terminal 100 may include a memory 110, a display 120, a position (or location) sensor 130, and a processor 140.

The user terminal 100 may be a terminal carried by a user, for example, a smartphone, a notebook, a tablet personal computer (PC), a smart television (TV), a mobile phone, a personal digital assistant (PDA), a laptop, a media player, an e-book reader, a terminal for a digital broadcast, a navigation, an MP3 player, a digital camera, a home appliance, and other mobile or non-mobile computing devices, but the embodiment is not limited thereto. In addition, the user terminal 100 may be a wearable terminal such as a watch, a pair of glasses, a hair band, and a ring which includes a communication function and a data processing function. The user terminal 100 may not be limited by the above-described description. In addition, the user terminal 100 may be equipped with a touch screen, and may be implemented such that a program can be executed by using fingers or a pen (e.g., stylus pen).

The memory 110 may be configured to store data necessary for the various embodiments described herein. The memory 110 may be implemented in the form of a memory embedded in the user terminal 100 according to a data storage use, or in the form of a memory attachable/detachable from the user terminal 100. For example, data for the operating of the user terminal 100 may be stored in a memory embedded to the user terminal 100, and data for an expansion function of the user terminal 100 may be stored in a memory attachable/detachable from the user terminal 100. The memory embedded in the user terminal 100 may be implemented as at least one of a volatile memory (e.g., a dynamic random access memory (DRAM), a static random access memory (RAM) (SRAM), or a synchronous dynamic RAM (SDRAM)), or a non-volatile memory (e.g., one time programmable read only memory (ROM) (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In the case of a memory attachable/detachable to the user terminal 100, the memory may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port, or the like.

The memory 110 according to an embodiment may be configured to store various data, programs or applications to operate/control the user terminal 100. The memory 110 may be configured to store control programs to control the user terminal 100 and the processor 140, applications initially provided from a manufacturer or downloaded from an outside, databases or associated data. For example, the memory 110 may be configured to store an application (e.g., the application described in FIG. 1) to control an external device according to an embodiment. Here, the application may be an application for remotely controlling a home appliance or the like within the home.

The display 120 may be implemented as a display including a self-emissive device or a display including a non-emissive device and a backlight. For example, the display may be implemented as a display of various forms such as, for example, and without limitation, a liquid crystal display (LCD), an organic light emitting diode (OLED) display, light emitting diodes (LEDs), a micro LED, a mini LED, a plasma display panel (PDP), a quantum dot (QD) display, a quantum dot light-emitting diodes (QLED), or the like. In the display 120, a driving circuit, which may be implemented in the form of an amorphous silicon (a-si) thin film transistor (TFT), a low temperature poly silicon (LTPS) TFT, an organic TFT (OTFT), or the like, a backlight unit, and the like may be included. The display 120 may be implemented as a touch screen coupled with a touch sensor, a flexible display, a rollable display, a three-dimensional (3D) display (3D display), a display physically coupled with a plurality of display modules, or the like.

The position sensor 130 may be configured to sense the position of the user terminal 100. The position sensor 130 may be implemented as a global positioning system (GPS) receiver, but may be applicable without being limited if position information of the user terminal 100 is obtainable.

The processor 140 may be electrically coupled with the memory 110 and configured to control the overall operation of the user terminal 100. The processor 140 may be configured as one or a plurality of processors. Specifically, the processor 140 may be configured to perform operations of the user terminal 100 according to various embodiments by executing at least one instruction stored in the memory 110.

According to an embodiment, the processor 140 may be implemented, for example, as a digital signal processor (DSP) configured to process a digital image signal, a microprocessor, a graphics processing unit (GPU), an artificial intelligence (AI) processor, a neural processing unit (NPU), and a time controller (TCON). However, the embodiment is not limited thereto, and may include, for example, and without limitation, one or more from among a central processing unit (CPU), a micro controller unit (MCU), a micro processing unit (MPU), a controller, an application processor (AP), a communication processor (CP), an advanced reduced instruction set computer (RISC) machine (ARM) processor, or the like, or may be defined by the corresponding term. In addition, the processor 140 may be implemented as a System on Chip (SoC) or a large scale integration (LSI) embedded with a processing algorithm, and may be implemented in the form of an application specific integrated circuit (ASIC) and a field programmable gate array (FPGA).

The processor 140 may be configured to control the display 120 to display a UI screen. Here, the UI screen may include a playback screen of various content such as an image, a moving image, a text, music, and the like, an application execution screen including various content, a web browser screen, a graphic user interface (GUI) screen, and the like.

The processor 140 according to an embodiment may be configured to provide a UI screen associated with the external device. In this case, the corresponding UI screen may be provided through an application which is a software that the user is to use on an operating system (OS). In this case, the application may be provided in an icon interface form on a screen of the display 120.

According to an example, the external device may be implemented as a home appliance such as a washing machine or a drying machine provided within the home. However, for convenience of description, the external device will be described below assuming that it is implemented as a washing machine. The UI screen provided through the application according to an example may provide various information associated with a cycle of the washing machine, and function as a control panel capable of input and output for the control of the washing machine. That is, the UI screen may, as a configuration for interfacing with the user, include an input interface for receiving an input of the user and an output interface displaying information (e.g., control information) according to the user input.

The processor 140 according to an embodiment may be configured to obtain position information of the user terminal 100 which is sensed by the position sensor 130. Here, because the user terminal 100 is a terminal carried by the user, the position information of the user terminal 100 may correspond to the position information of the user.

The processor 140 may be configured to control the display 120 to provide a UI for controlling a cycle time based on information associated with the cycle time of the washing machine and information on the user position. The processor 140 according to an example may be configured to control the display 120 to provide a UI for controlling a preset cycle or a cycle in progress based on information associated with the preset cycle time of the washing machine, the cycle time in progress, and the position information of the user.

The processor 140 may be configured to predict a time of arrival of the user arriving at the location where the washing is positioned, for example, at the home based on the position information of the user. For example, the processor 140 may be configured to predict the time until the user arrives at home from the current position of the user based on various information such as a movement history of the user (e.g., average time of arrival from work to home), transport means used by the user, user walk speed, and the like.

Further, the processor 140 may be configured to control the display 120 to provide a UI for controlling the preset cycle or the cycle in progress of the washing machine based on the estimated time of arrival of the user and information associated with the cycle time of the washing machine. Here, information may be obtained based on information associated with the user control command input in association with the cycle of the washing machine, information received from the washing machine, or the like. In an example, based on a user control command for starting a washing cycle being received one hour prior to, the time spent in the washing cycle and information on a remaining cycle time taking into consideration the current time may be obtained. In another example, information on the remaining cycle time based on cycle information received from the washing machine may be obtained. The processor 140 according to an example may be configured to provide a UI asking whether to perform an additional cycle to prevent the laundry from being unattended to after completing washing when the estimated time of arrival of the user is late by a threshold time or more than a completion time of the washing cycle currently in progress. For example, the additional cycle may be a rinsing cycle in the case of a washer, an extension in tumbling time for drying in the case of a dryer, and the like. The processor 140 according to another example may provide a UI asking whether to delay the preset cycle to prevent laundry being unattended to after completing washing when the estimated time of arrival of the user is late by a threshold time or more than the completion time of the cycle according to the preset cycle time.

The processor 140 according to an embodiment may be configured to control the display 120 to provide a UI which includes a plurality of lifestyle items. For example, the processor 140 may be configured to provide, based on a specific menu item being selected from the application execution screen, a UI which including the plurality of lifestyle items. The corresponding menu item may be provided in an initial screen when installing the application, but is not necessarily limited thereto. For example, it could be implemented so that the lifestyle may be changed from a setting item, or the like.

In this case, the processor 140 may be configured to control, based on one from among the plurality of lifestyle items being selected, the washing machine to automatically set a washing course corresponding to the selected item. Accordingly, a default course may be set which is to be used in the washing machine according to a characteristic of the user.

The processor 140 according to an embodiment may be configured to provide a UI for the user to edit the washing course to be used in the washing machine or a device controlling the washing machine (e.g., user terminal 100). Accordingly, the user may be able to conveniently edit a necessary course and an unnecessary course to oneself at any time.

The processor 140 according to an embodiment may be configured to control the display 120 to provide a UI asking whether to change the preset cycle time of the washing machine based on the preset cycle time of the washing machine and the user position information. In an example, the processor 140 may be configured to provide a corresponding UI screen by obtaining the position information of the user before a threshold time (N minutes) of starting the preset cycle. Here, the threshold time (N minutes) may be set to a suitable time based on a type of the washing machine (e.g., washer or dryer), a type of the cycle (e.g., washing cycle, rinsing cycle, drying cycle), or the like. In another example, the processor 140 may be configured to obtain, before a specific cycle step begins or ends, for example, before a threshold time for the washing or spin drying cycle is started or before a threshold time for washing or spin drying cycle is ended, the user position information and provide the corresponding UI screen.

The processor 140 according to an embodiment may control the display 120 to provide a UI asking whether to perform an additional cycle in the washing machine based on the remaining cycle time of the washing machine and the user position information. For example, the processor 140 may be configured to provide the corresponding UI screen by obtaining the user position information N minutes before the cycle is completed or at a time point at which the cycle is completed.

According to an embodiment described above, because the user is able to control the washing machine from the outside in case the time of arrival is delayed, odors or creases which may generate by leaving the laundry unattended after the washing cycle or the drying cycle is completed may be prevented.

In addition, the processor 140 may be configured to provide a UI screen showing a notification of unattended laundry at predetermined time intervals when a door is not opened even after the cycle of the washing machine is completed.

The processor 140 according to an embodiment may be configured to control the display 120 to provide a UI including a remaining amount of detergent based on a number of washing cycles, an amount of detergent used when washing, and current amount of detergent received from the washing machine. In an example, the processor 140 may be configured to calculate the amount of detergent spent in the washing cycle based on the type of the washing course, the amount of washing, and the like received from the washing machine, and calculate the remaining amount of detergent by subtracting the calculated amount of detergent from the current amount of detergent. In another example, it may be possible for the processor 140 to receive information on the amount of detergent spent in the washing cycle from the washing machine.

In addition, the processor 140 may be configured to update the remaining amount of detergent based on detergent purchase information received from a detergent purchasing website. For example, based on the user receiving information of having purchased detergent from the detergent purchasing website, the processor 140 may be configured to automatically update the remaining amount of detergent based on the detergent purchase information received from the detergent purchasing website. Here, the detergent purchase information may include information on a detergent purchase date, an amount of detergent purchased, a type of detergent purchased, and the like.

The processor 140 according to an embodiment may be configured to control the display 120 to provide a UI which includes an item for setting whether to maintain remote control of the washing machine. In addition, the processor 140 may be configured to maintain, based on being set to maintain remote control on the UI, the remote control of the device regardless of the completing the cycle of the washing machine. Typically, because the power of the washing machine is turned-off automatically when the cycle is complete, additional controlling remotely is not possible. However, according to an embodiment, it may be configured for the user to select whether to maintain remote control. That is, if the user selects to maintain remote control, the washing machine may maintain a communicable state even after the cycle is complete. For example, the washing machine may turn-off only the display 120, and maintain an activated state of a communication module, for example, a Wi-Fi module. For example, the above may be designated as a standby state. Accordingly, the user may be able to additional control the washing machine remotely until the door of the washing machine is opened even after the cycle is completed. According to an example, the corresponding function may be implemented to be applicable as a default if set as "ON" or "OFF" through a menu option of the user terminal 100.

The processor 140 according to an embodiment may be configured to control, based on the amount of detergent remaining in an automatic detergent dispenser provided in the washing machine being identified as less than or equal to a threshold value, the display 120 to provide a UI guiding an insertion of detergent.

In addition, the processor 140 may be configured to control, based on identifying that the amount of detergent remaining in the automatic detergent dispenser provided in the washing machine is less than or equal to the threshold value and that cleaning of the automatic detergent dispenser is necessary, the display 120 to provide a UI which guides the insertion of detergent and the cleaning of the automatic detergent dispenser.

Various embodiments of the disclosure will be described in greater detail below through various examples of the UI screens.

Figure 3A:
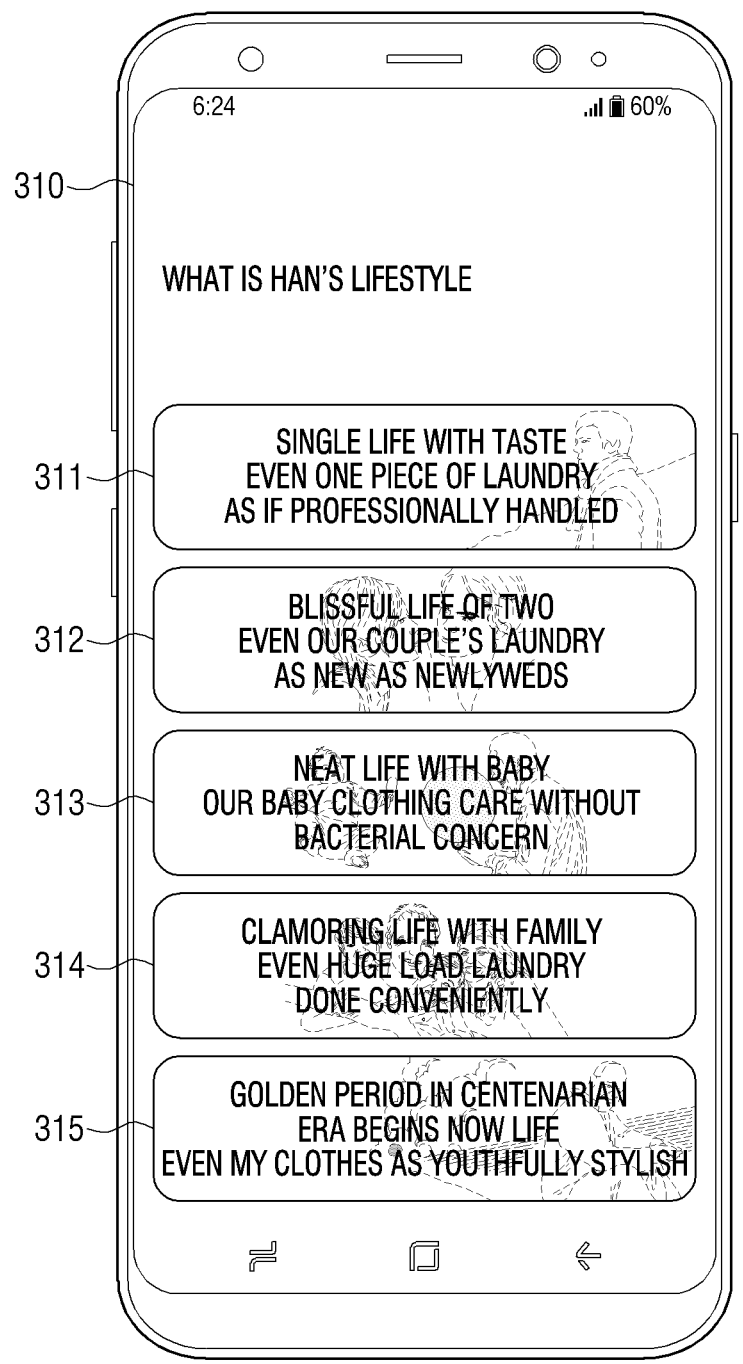
Figure 3B:
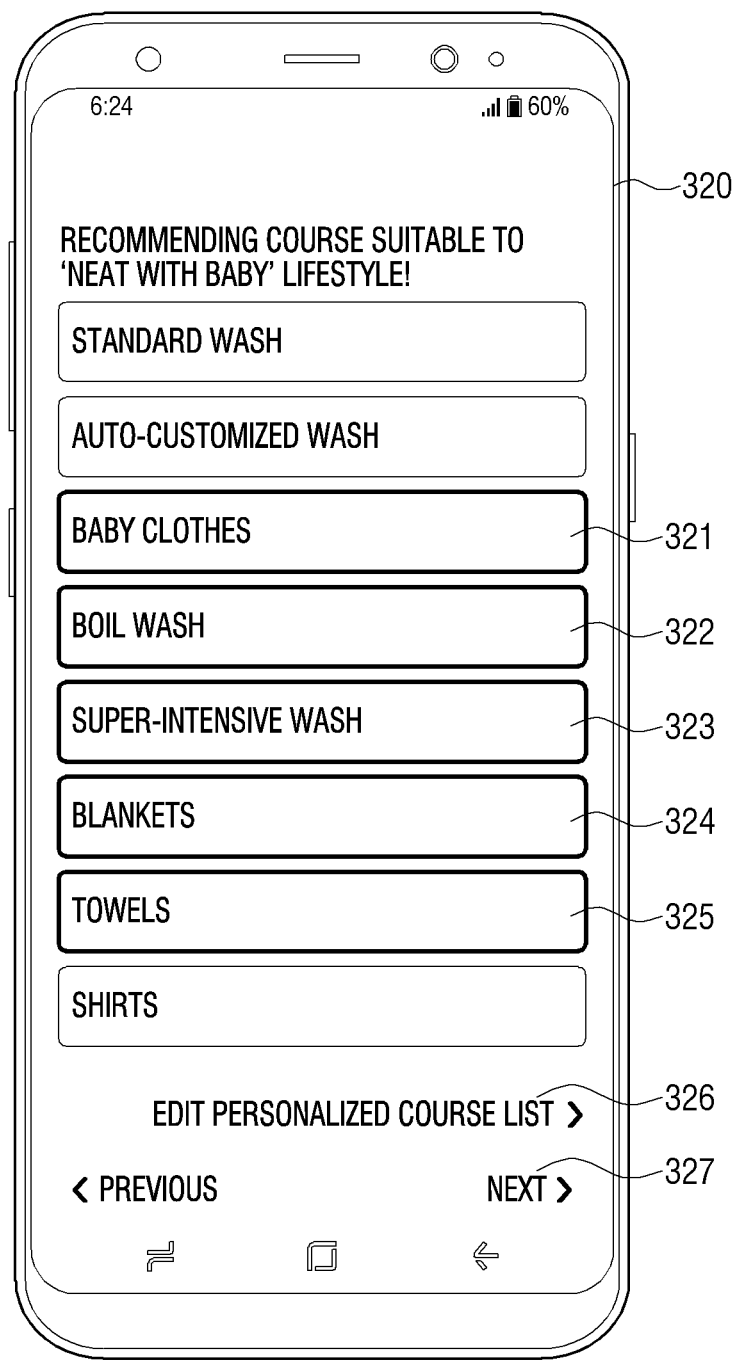

FIGS. 3A, 3B, and 3C are diagrams illustrating a UI screen according to various embodiments of the disclosure.

Referring to FIG. 3A, based on the user logging-in to the user account by using an application, a UI screen 310 for receiving the user selection in lifestyle may be provided. Here, the UI screen may include a plurality of items 311, 312, 313, 314, and 315 corresponding to various lifestyles. In this case, the plurality of items 311 to 315 may be selectable based on a user touch input, but is not necessarily limited thereto.

Based on one lifestyle being selected from the UI screen 310 shown in FIG. 3A, a UI screen 320 including a plurality of washing courses 321, 322, 323, 324, and 325 corresponding to the relevant lifestyle may be provided as shown in FIG. 3B. For example, based on a third lifestyle item 313 being selected from a UI screen 310 shown in FIG. 3A, the UI screen 320 including the plurality of washing courses recommended from the relevant lifestyle may be provided. In addition, the corresponding UI screen 320 may include a menu item 326 through which at least a part from among the recommended courses is editable, that is, remove or add. However, if the user selects a next item 327, the UI screen may be automatically set to a recommended course.

Information on a plurality of recommended courses corresponding to each lifestyle may be prestored in the memory 110, or received from the server. For example, the corresponding information may include common course information corresponding to all of a plurality of lifestyles and course information corresponding to each lifestyle as shown in FIG. 3C.

Figure 4A:
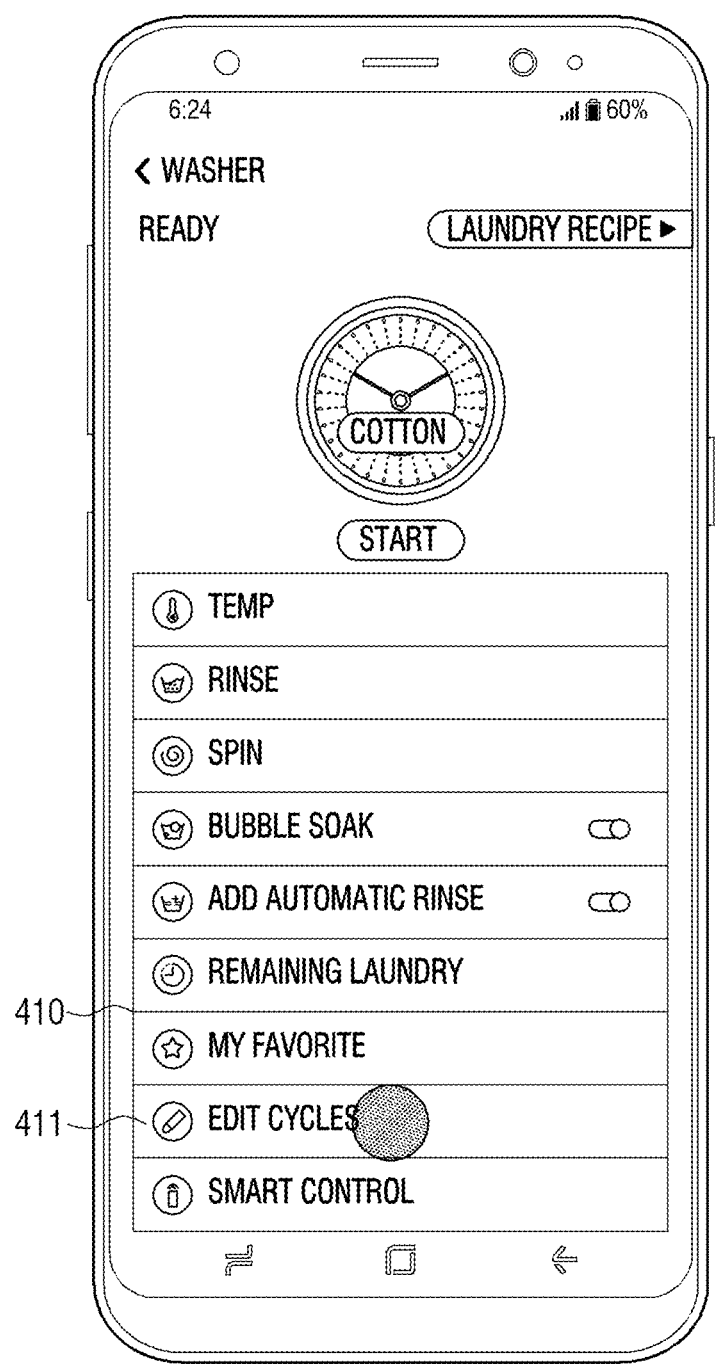
FIGS. 4A and 4B are diagrams illustrating a UI screen according to various embodiments of the disclosure.
Figure 4B:
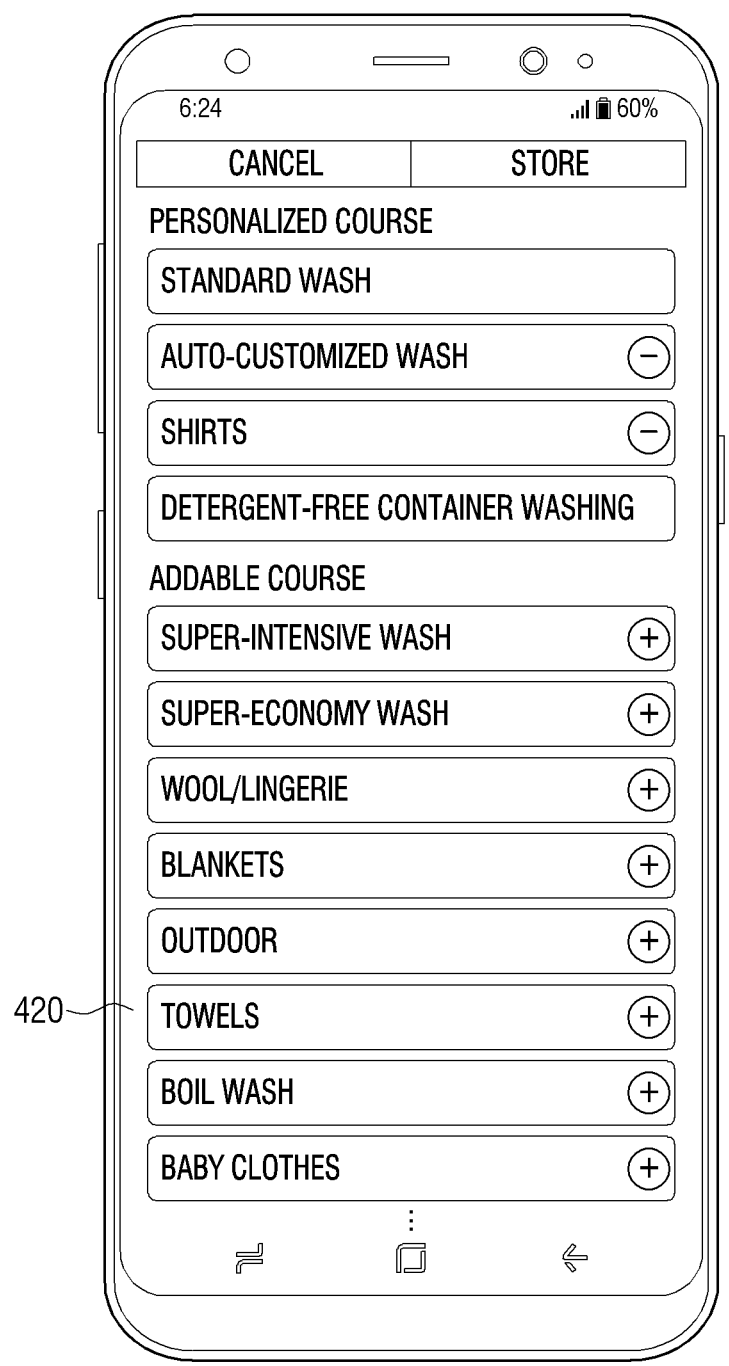

FIGS. 4A and 4B are diagrams illustrating a UI screen according to various embodiments of the disclosure.

Referring to FIGS. 4A and 4B, the processor 140 may be configured to provide a UI screen including the plurality of lifestyle items.

For example, a UI screen 410 which includes a menu item 411 for editing the washing course set as shown in FIG. 4A may be provided.

In this case, when the menu item 411 is selected, a UI screen 420 which includes a washing course list that is addable and deletable may be provided as shown in FIG. 4B. For example, the corresponding UI screen 420 may include a first list 421 of currently set washing courses and a second list 422 of additionally addable washing courses to the current washing course list as shown in FIG. 4B. In this case, an item 421-1 capable of removing each of the washing courses may be provided together in the washing courses included in the first list 421, and an item 422-1 capable of adding each of the washing courses to the washing courses included in the second list 422 may be provided together therewith.

FIGS. 5A, 5B, 5C, and 5D are diagrams illustrating a UI screen according to various embodiments of the disclosure.

Referring to FIGS. 5A to 5D, a UI screen for managing the amount of detergent may be provided.

Figure 5A:
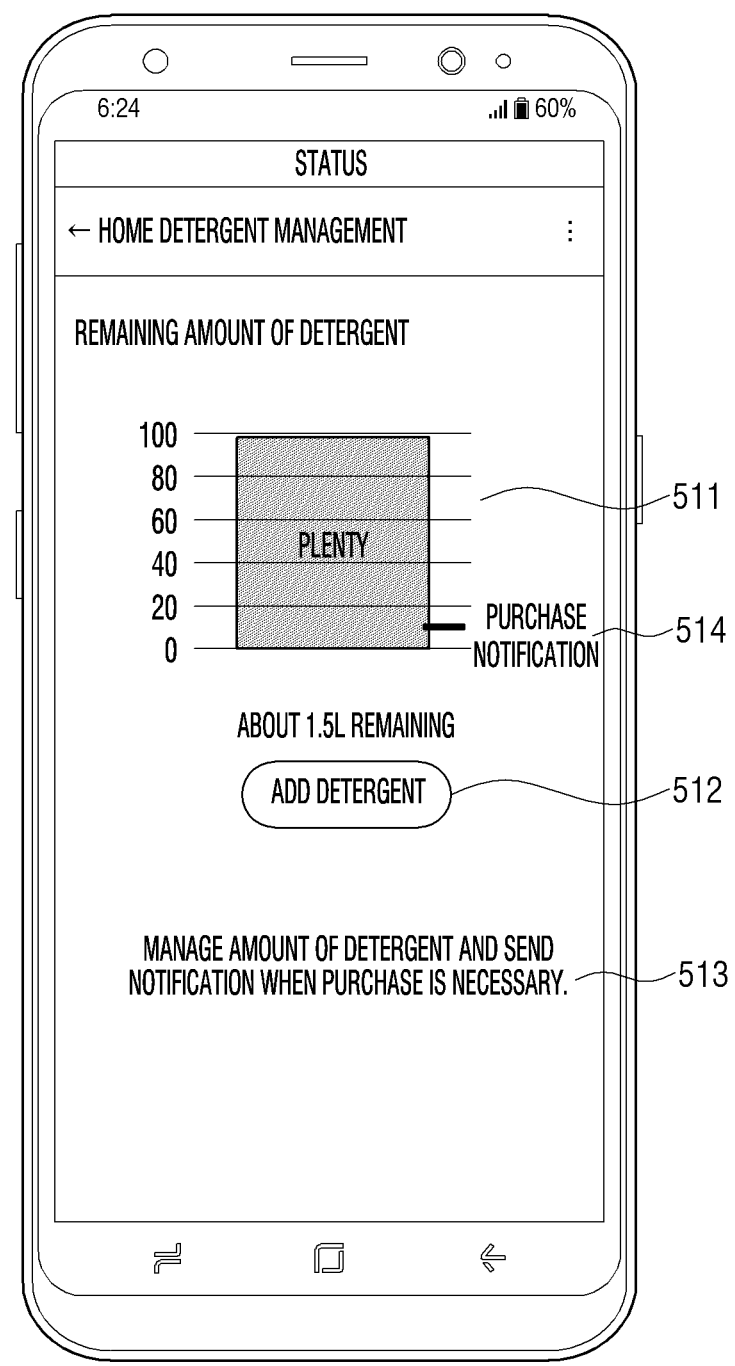
FIGS. 5A, 5B, 5C, and 5D are diagrams illustrating a UI screen according to various embodiments of the disclosure.
Figure 5B:
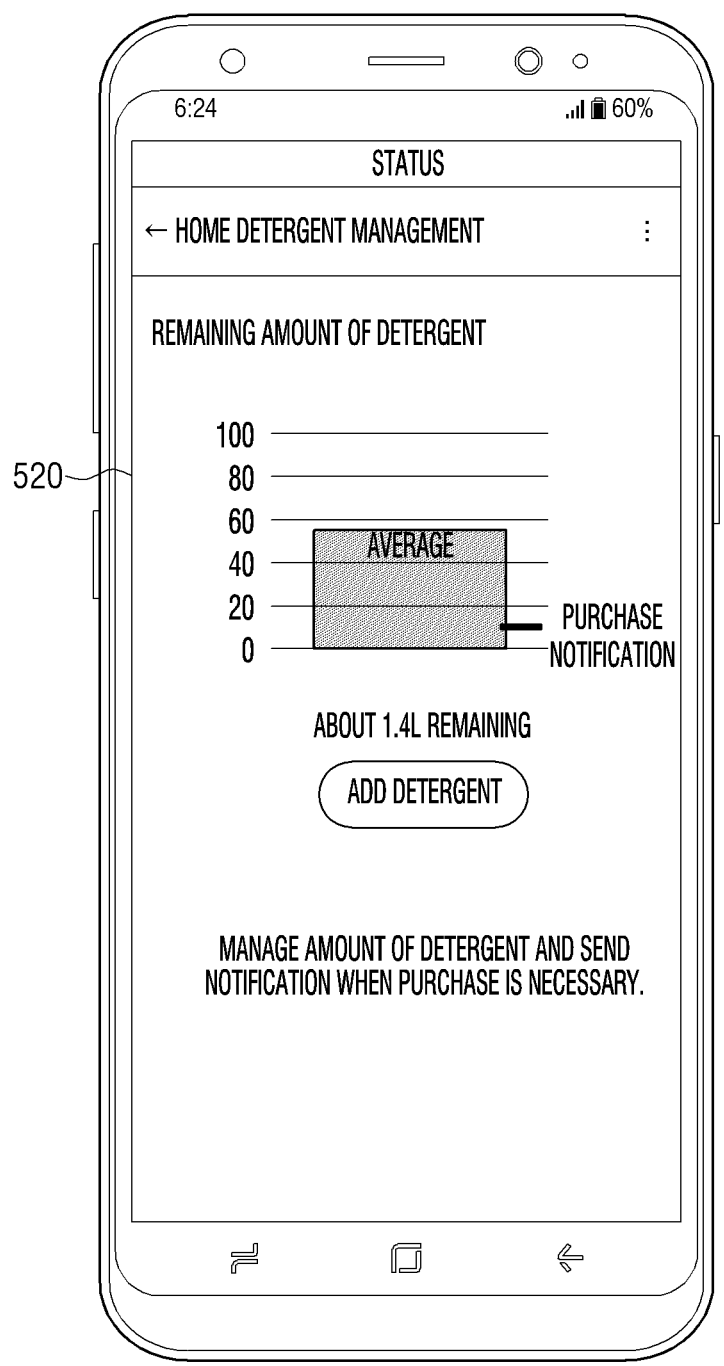

For example, the processor 140 may be configured to provide a UI screen 510 which includes information on the amount of detergent remaining in the washing machine as shown in FIG. 5A. In this case, the corresponding UI screen 510 may include an image 511 showing the remaining amount of detergent and an item 512 capable of inputting the amount of detergent. In addition, the corresponding UI screen 510 may include guide information 513 associated with managing the amount of detergent. In addition, the corresponding UI screen 510 may include guide information 514 on a threshold value which is used to guide the amount of detergent purchased. In addition, based on the remaining amount of detergent reducing according to a washing progress of the washing machine, a UI screen 520 showing the reduced remaining amount of detergent may be provided as shown in FIG. 5B.

The processor 140 according to an embodiment may be configured to provide the UI screens 510 and 520 which include the number of washing cycles, the amount of detergent used when washing, and the remaining amount of detergent based on the current amount of detergent received from the washing machine.

Figure 5C:
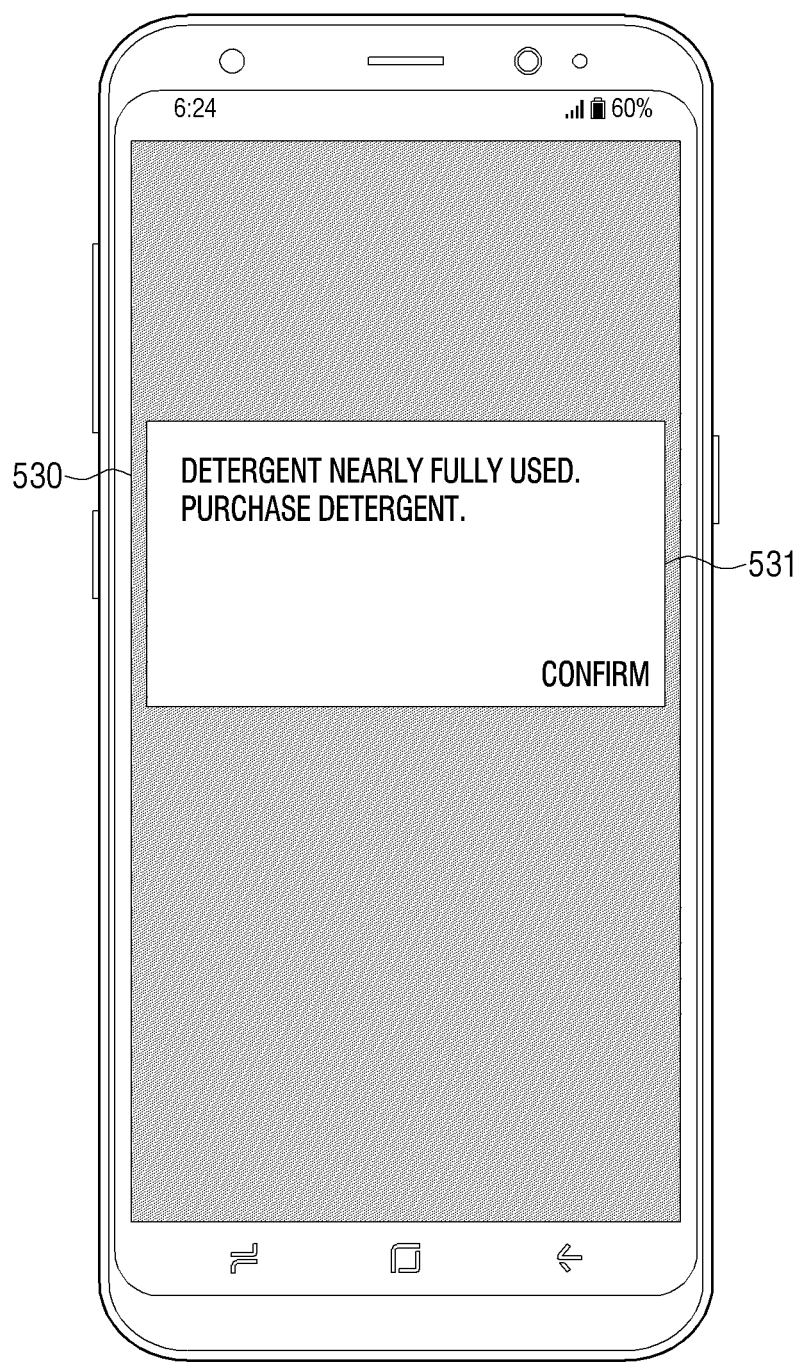

According to an embodiment, the processor 140 may be configured to provide a UI screen 530 which includes guide information 531 recommending the purchasing of detergent as shown in FIG. 5C. For example, the processor 140 may be configured to provide, based on the remaining amount of detergent reaching below the threshold value (i.e., less than the threshold value), the corresponding UI screen 530 guiding to purchase detergent.

Figure 5D:
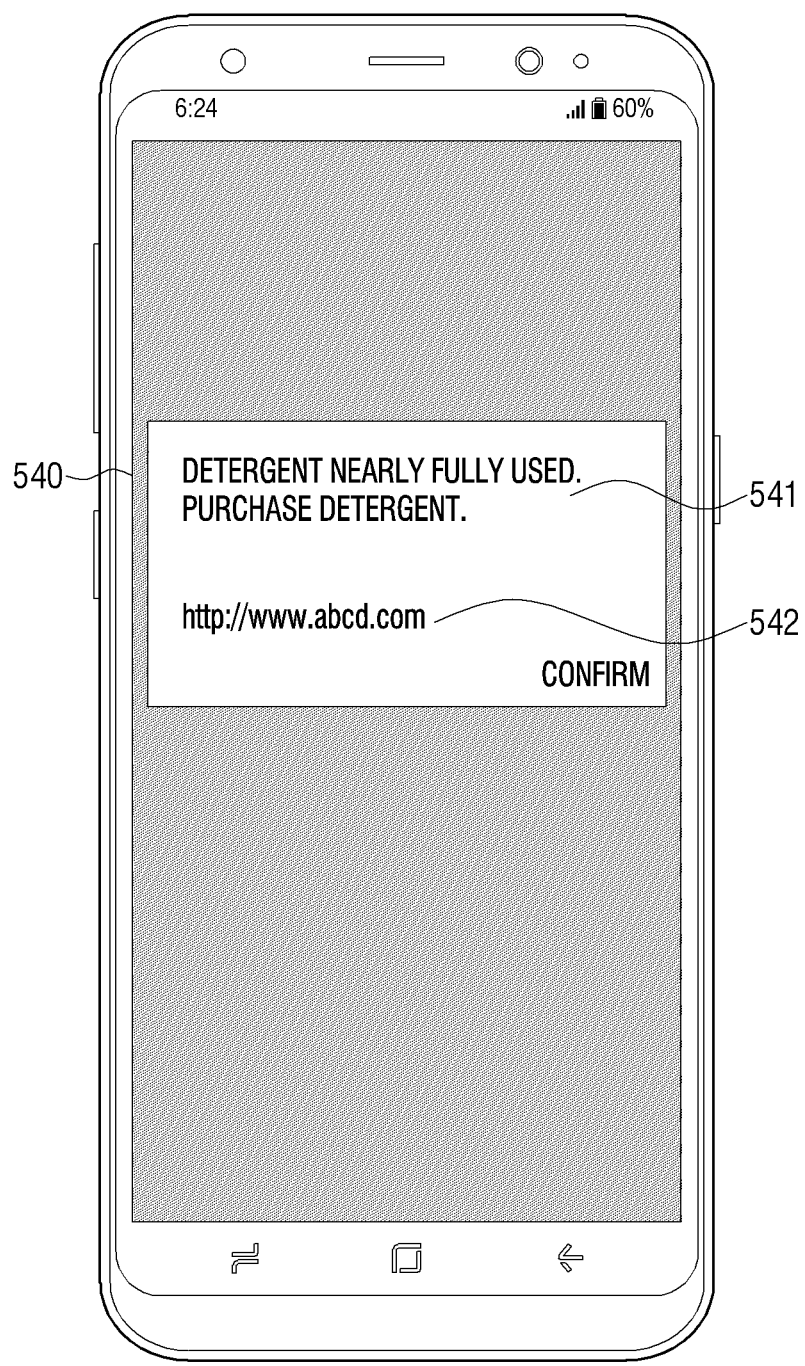

According to another example, the processor 140 may be configured to provide a UI screen 540 which includes guide information 541 recommending the purchasing of detergent and link information 542 to a website for purchasing the detergent as shown in FIG. 5D. In addition, the processor 140 may be configured to update the remaining amount of detergent based on the detergent purchase information received from the detergent purchasing website, and provide a UI screen providing information on an updated final amount of detergent. Here, the detergent purchase information may include information on the detergent purchase date, the amount of detergent purchased, the type of detergent purchased, and the like.

Figure 6A:
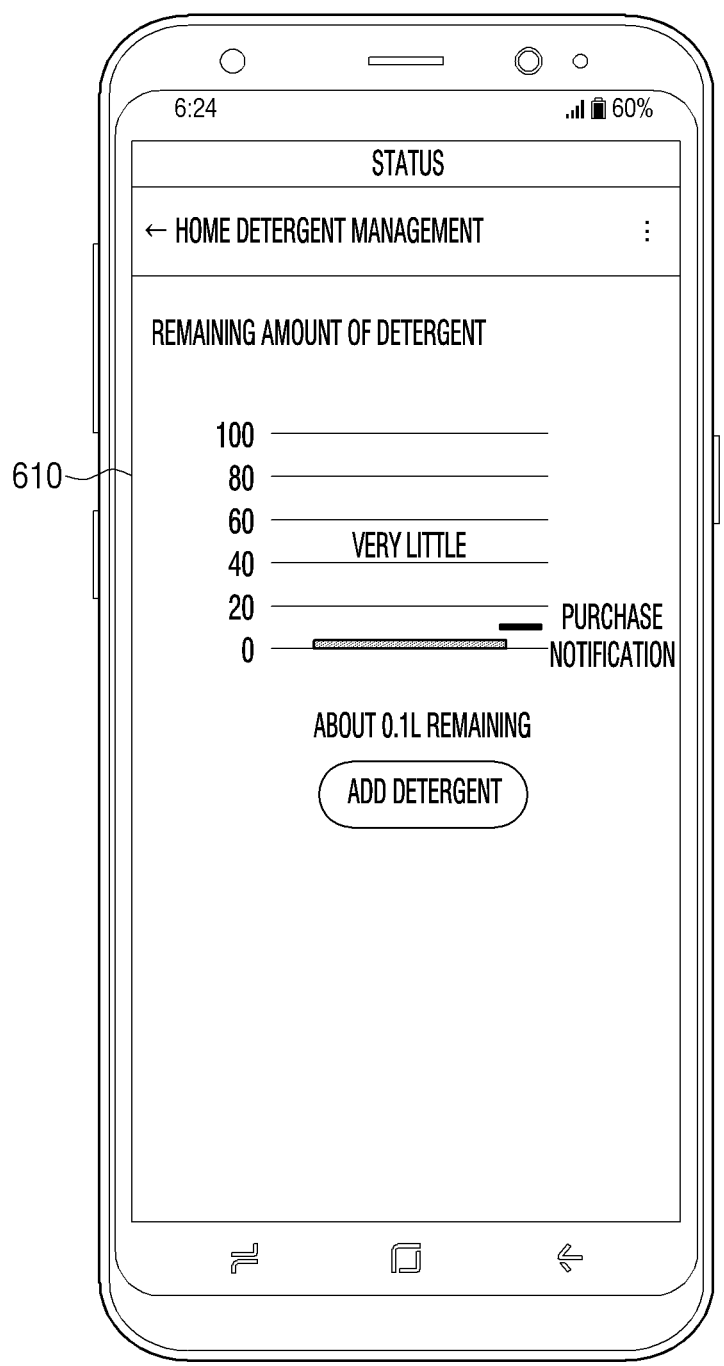
FIGS. 6A, 6B, and 6C are diagrams illustrating a UI screen according to various embodiments of the disclosure.
Figure 6B:
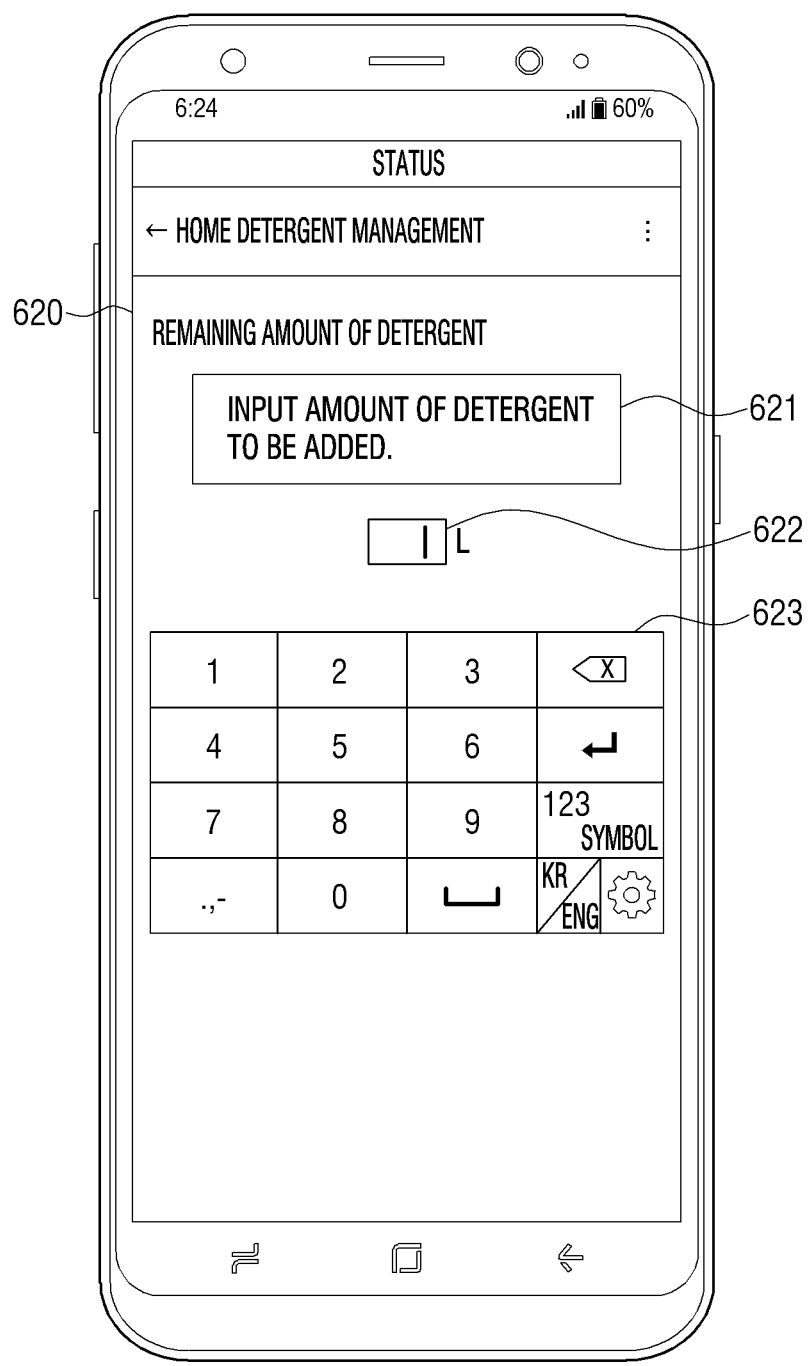
Figure 6C:
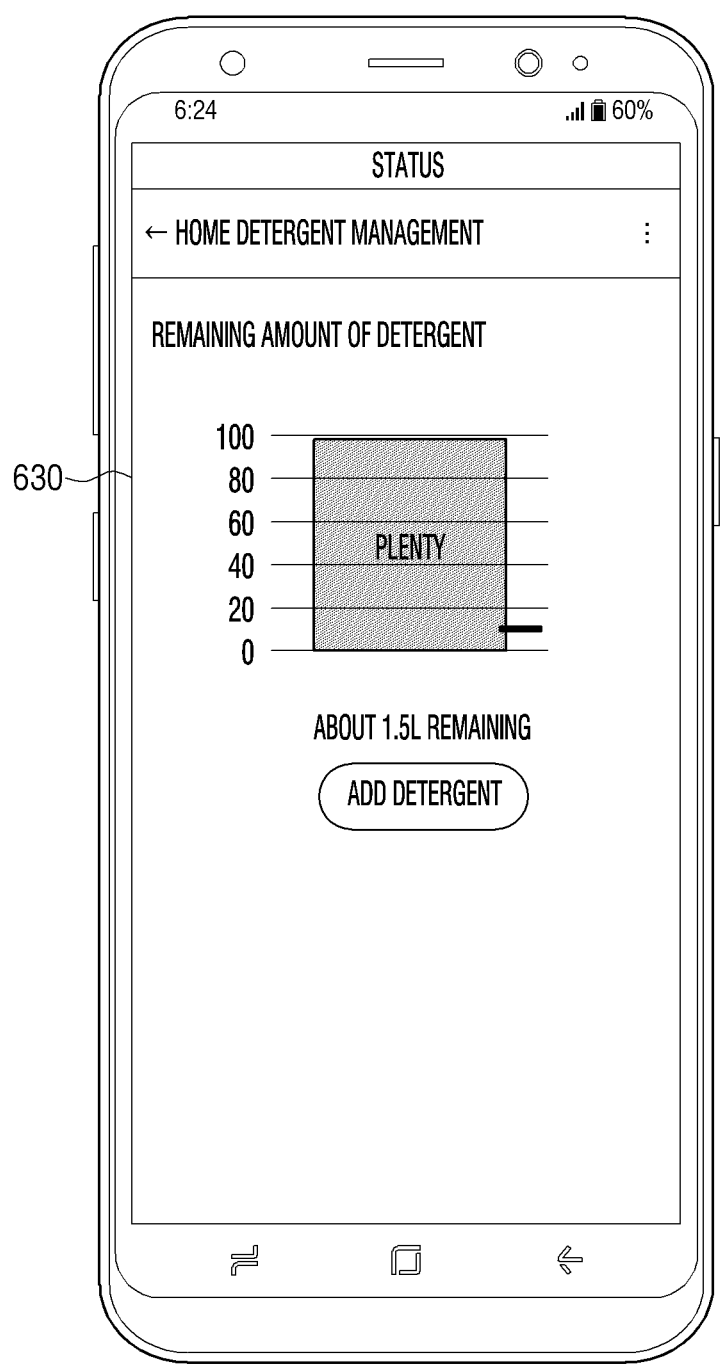

FIGS. 6A, 6B, and 6C are diagrams illustrating a UI screen according to various embodiments of the disclosure.

Referring to FIGS. 6A to 6C, the processor 140 may be configured to provide a UI screen for inputting the amount of detergent.

Referring to FIG. 6A, based on an item 611 for adding detergent being selected from a UI screen 610 which includes information on the remaining amount of detergent, a UI screen 620 for adding the amount of detergent may be provided as shown in FIG. 6B. The corresponding UI screen 620 may be configured to provide information guiding to add the amount of detergent 621, an input window to input the amount of detergent to be added 622, and a keyboard screen for inputting the amount of detergent 623 (e.g., a number keyboard screen).

Based on the amount of detergent to be added being input through the UI screen 620 as shown in FIG. 6B, the remaining amount of detergent may be updated, and a UI screen 630 providing information on the updated final amount of detergent may be provided as shown in FIG. 6C.

FIGS. 7A, 7B, 7C, and 7D are diagrams illustrating a UI screen according to various embodiments of the disclosure.

Referring to FIGS. 7A to 7D, the processor 140 may be configured to provide a UI screen for managing the cycle time.

According to an embodiment, odors or creases (e.g., wrinkles) may be generated if laundry is not taken out and is left unattended after the washing cycle or the drying cycle is complete. To prevent this problem, the processor 140 according to an embodiment may provide a UI screen for managing the cycle time of the washer based on the cycle time of the washing machine and the user position information. For example, the processor 140 may be configured to provide a UI screen in a form of a notification window as shown in FIGS. 7A to 7D.

Figure 7A:
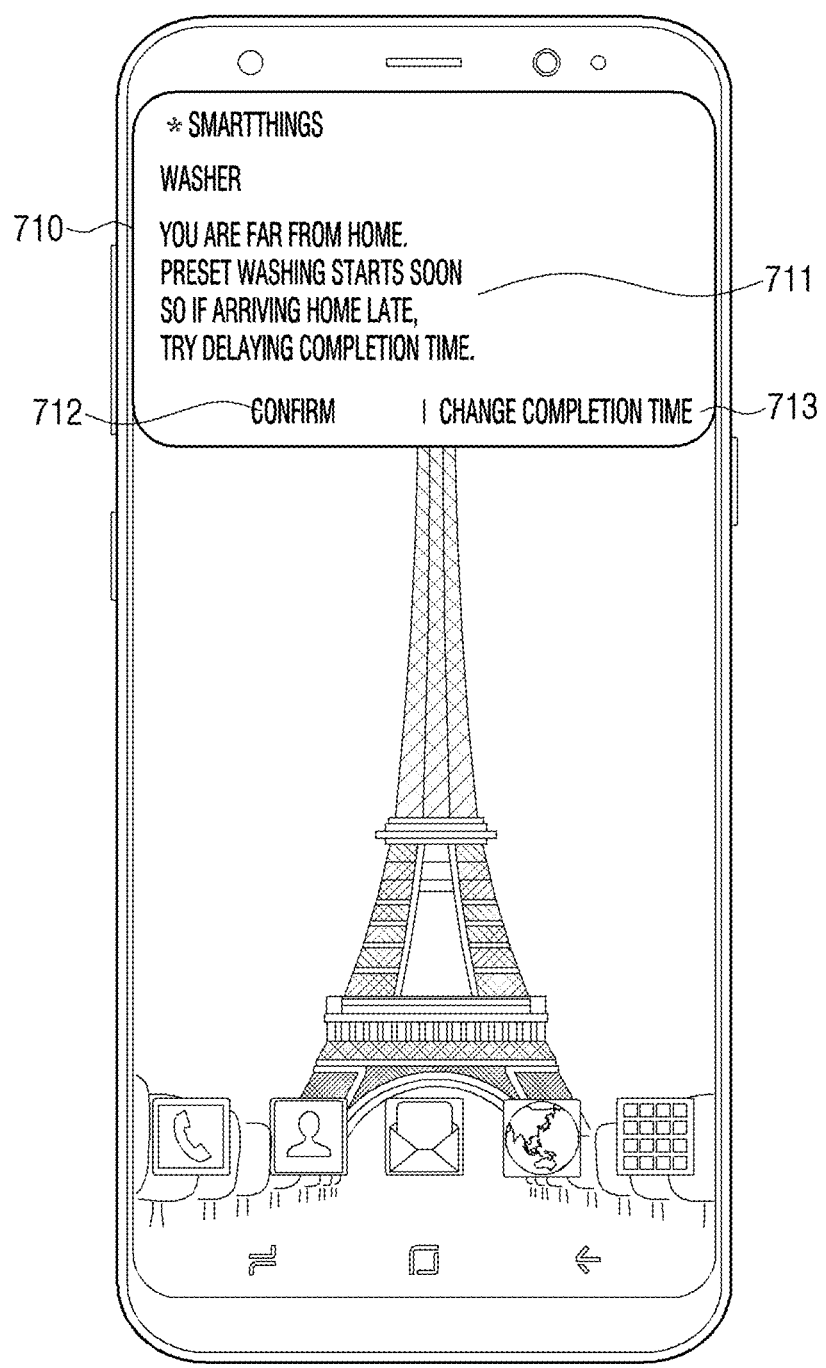
FIGS. 7A, 7B, 7C, and 7D are diagrams illustrating a UI screen according to various embodiments of the disclosure.

Referring to FIG. 7A, the processor 140 may be configured to provide a UI screen 710 asking whether to change the preset cycle time of the washing machine based on the preset cycle time set in the washing machine and the user position information. The corresponding UI screen 710 may include information guiding to change the preset time 711, an item 712 for completing the corresponding UI screen 710, and an item 713 for changing the completion time.

Figure 7B:
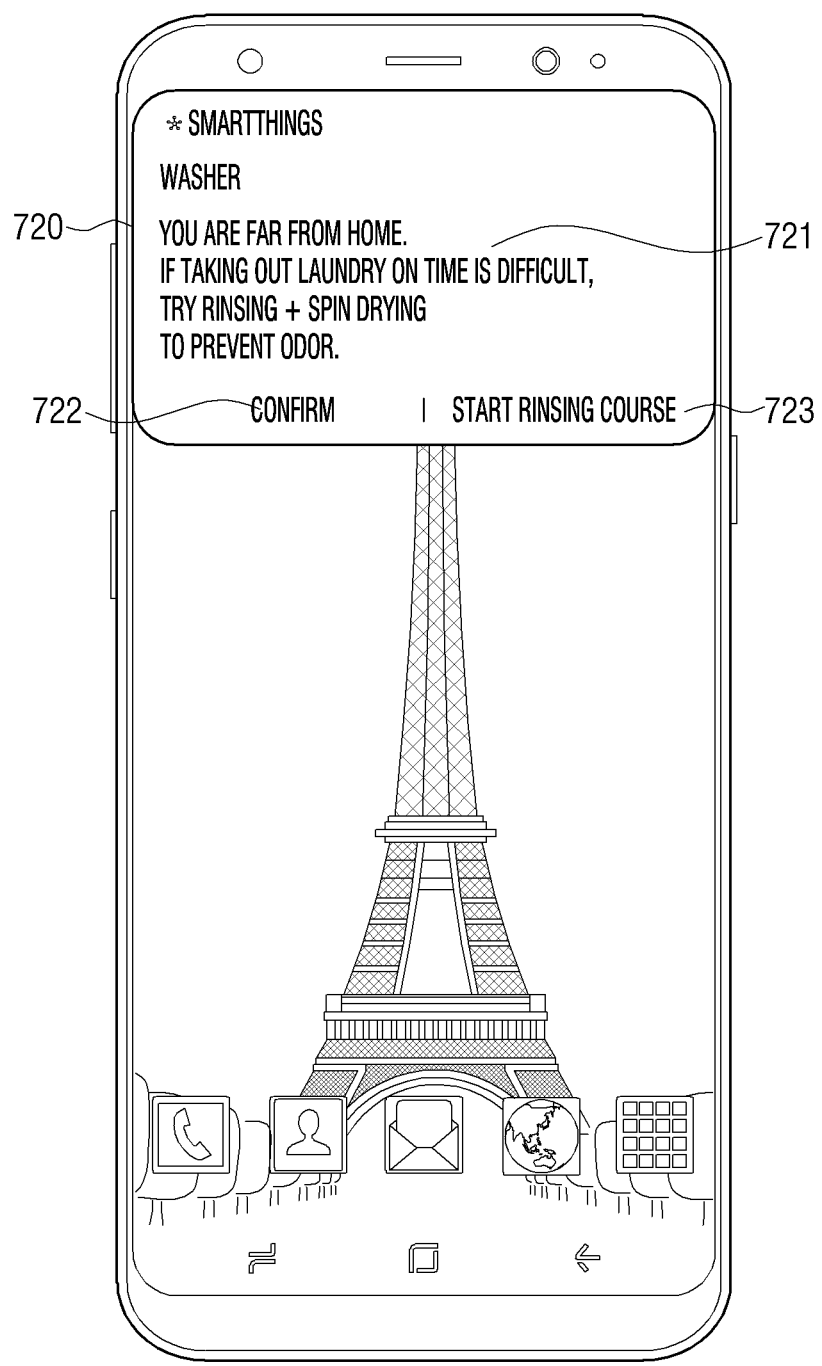

Referring to FIG. 7B, the processor 140 may be configured to provide a UI screen 720 asking whether to perform an additional cycle in the washing machine based on the remaining cycle time of the washing machine and the user position information. The corresponding UI screen 720 may include information guiding the additional cycle 721, an item 722 for completing the corresponding UI screen 720, and an item 723 for controlling the additional cycle (e.g., a rinsing course or adding the rinsing course).

Figure 7C:
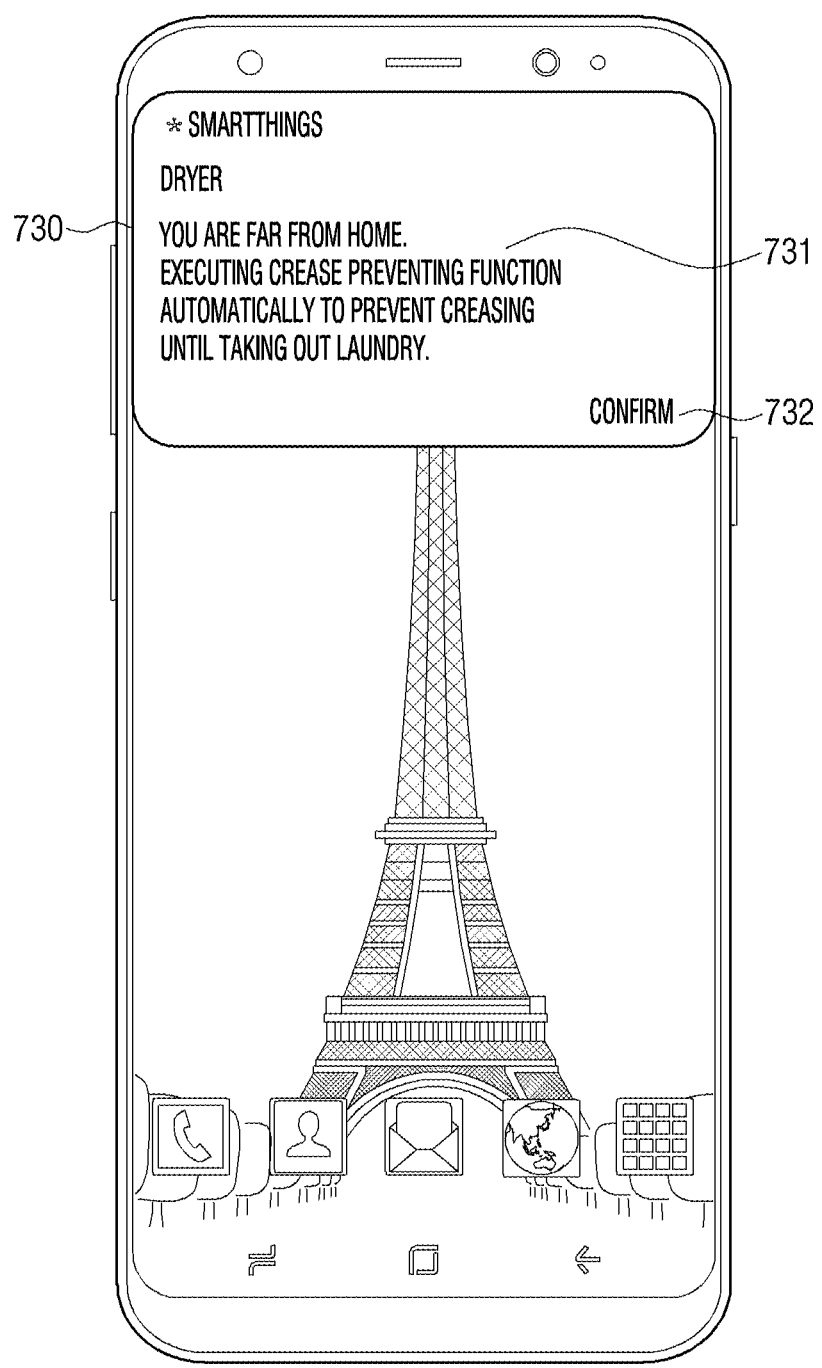

Referring to FIG. 7C, the processor 140 may be configured to provide a UI screen 730 notifying that the additional cycle has been performed in the drying machine based on the remaining cycle time of the drying machine and the user position information. The corresponding UI screen 730 may include information automatically notifying that the additional cycle has been performed 731 and an item 732 for completing the corresponding UI screen 720. In this case, the drying machine may automatically perform tumbling until the door is opened to prevent creasing according to the control of the user terminal 100.

However, even in the case of drying machines, a UI screen may be provided for the user to select whether to perform an additional cycle as shown in FIG. 7B.

Figure 7D:
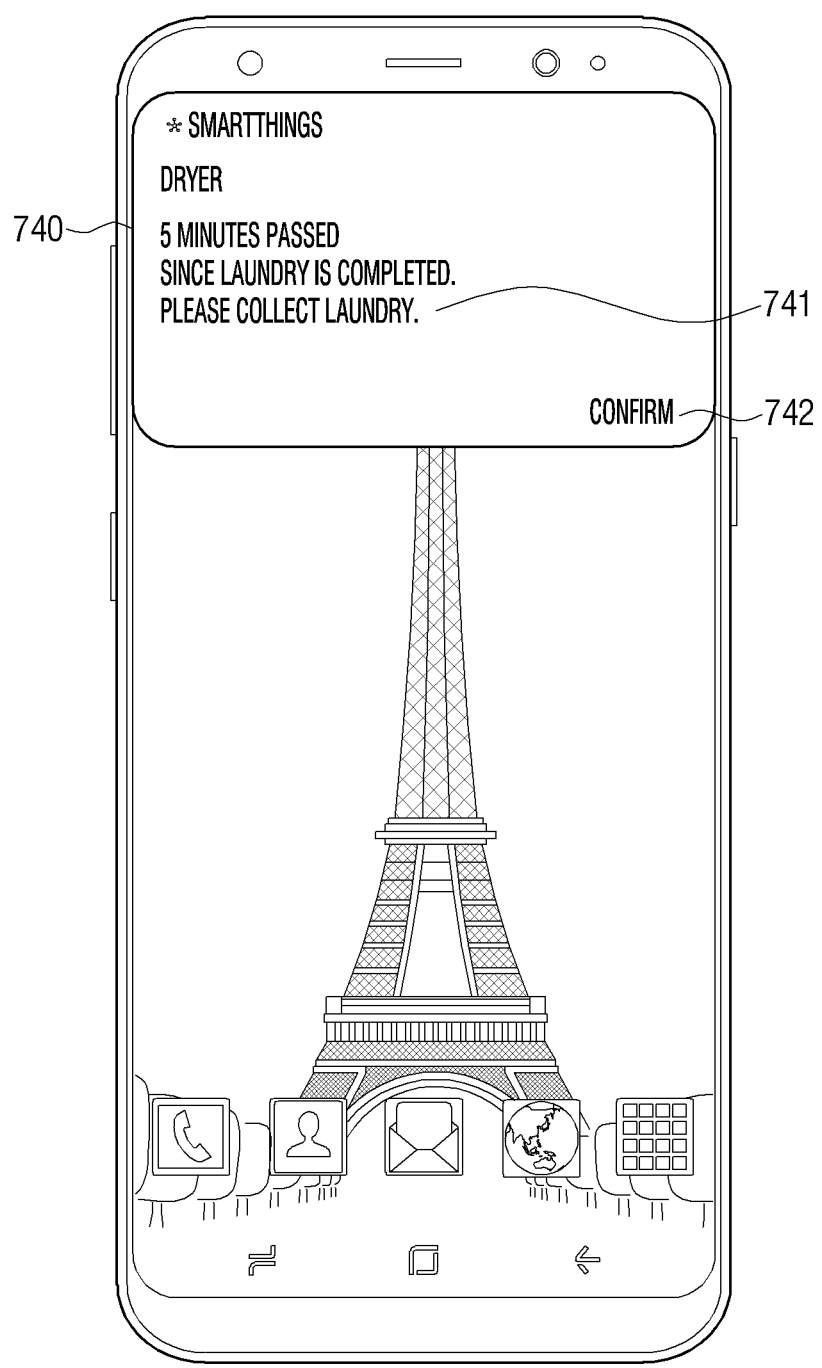

Referring to FIG. 7D, the processor 140 may be configured to provide a UI screen 740 showing a notification of the laundry being unattended at predetermined time intervals if the door is not opened even after the cycle of the washing machine is completed. The corresponding UI screen 740 may include information on time passed after the washing cycle is completed 741 and an item 742 for completing the corresponding UI screen 740.

According to an embodiment described above, because the user is able to further control the washing machine from the outside in case the time of arrival is delayed, odors or creases which may generate based on leaving the laundry unattended after the washing cycle or the drying cycle is completed may be prevented.

Figure 8A:
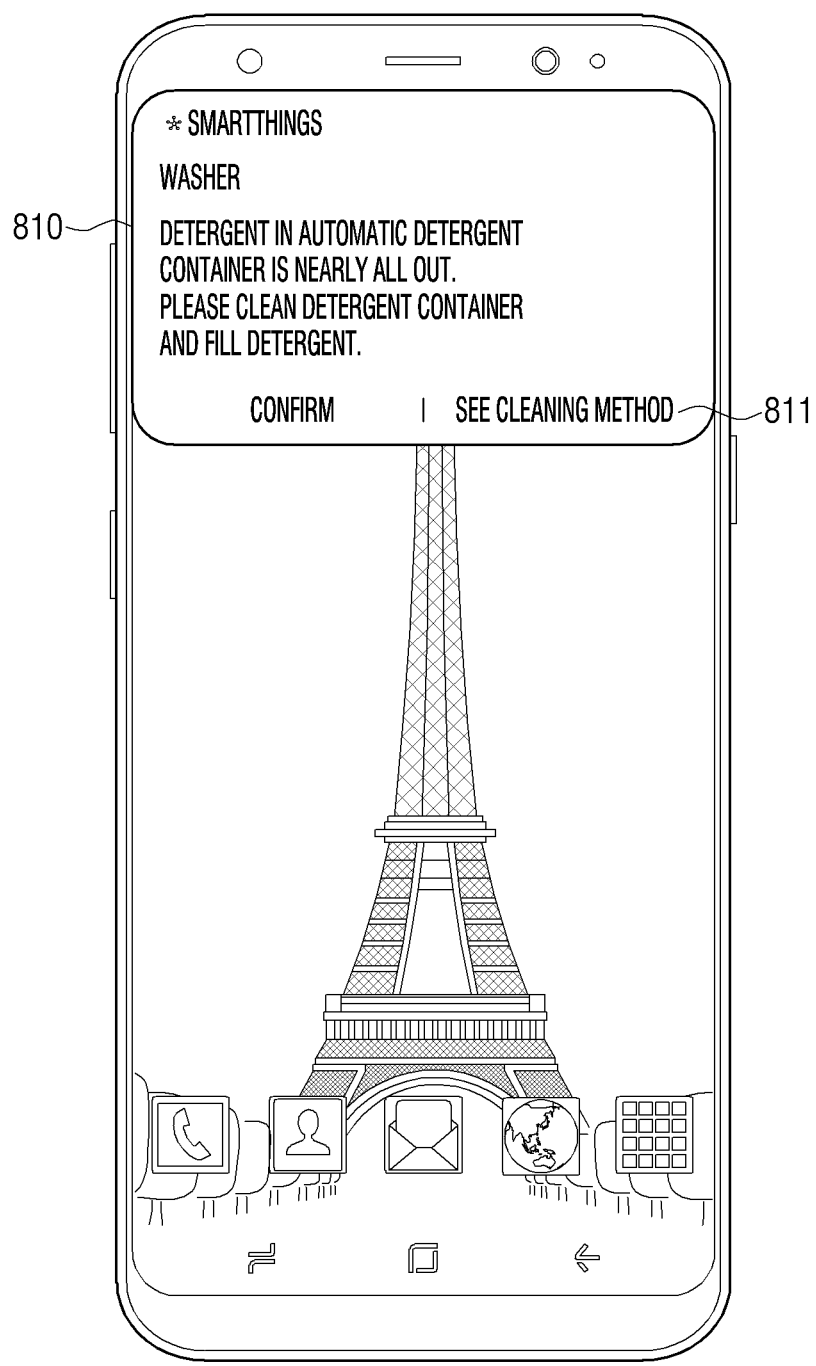
FIGS. 8A and 8B are diagrams illustrating a UI screen according to various embodiments of the disclosure.
Figure 8B:
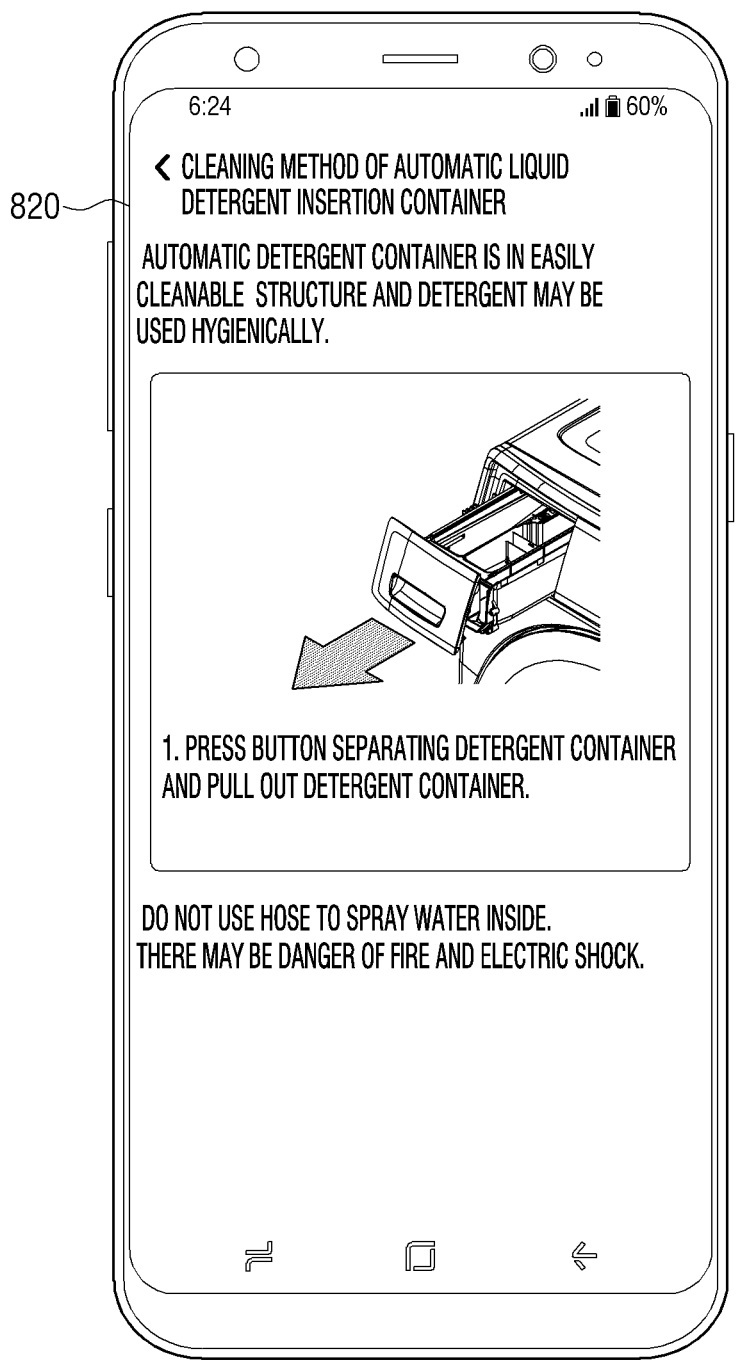

FIGS. 8A and 8B are diagrams illustrating a UI screen according to various embodiments of the disclosure.

Referring to FIGS. 8A and 8B, the processor 140 may be configured to provide a UI screen for controlling the automatic dispensing of the detergent.

Typically, because a cleaning period of the automatic detergent dispenser provided in the washing machine is not known and the cleaning period is missed, a problem of a detergent container becoming unhygienic may arise. To solve this problem, the processor 140 may be configured to provide, based on identifying that the amount of detergent remaining in the automatic detergent dispenser provided in the washing machine is less than or equal to the threshold value and that cleaning of the automatic detergent dispenser is necessary, a UI guiding the cleaning of the automatic detergent dispenser.

For example, the processor 140 may be configured to provide a UI screen 810 which includes information guiding the cleaning of the automatic detergent dispenser 811 and a show cleaning method item 812 as shown in FIG. 8A. Based on the show cleaning method item 812 being selected from the corresponding UI screen 810, a UI screen 820 informing of the cleaning method of the automatic detergent dispenser may be provided as shown in FIG. 8B. Accordingly, because the user is able to clean the automatic detergent dispenser at an appropriate time point, the automatic detergent dispenser may be hygienically maintained.

Figure 9A:
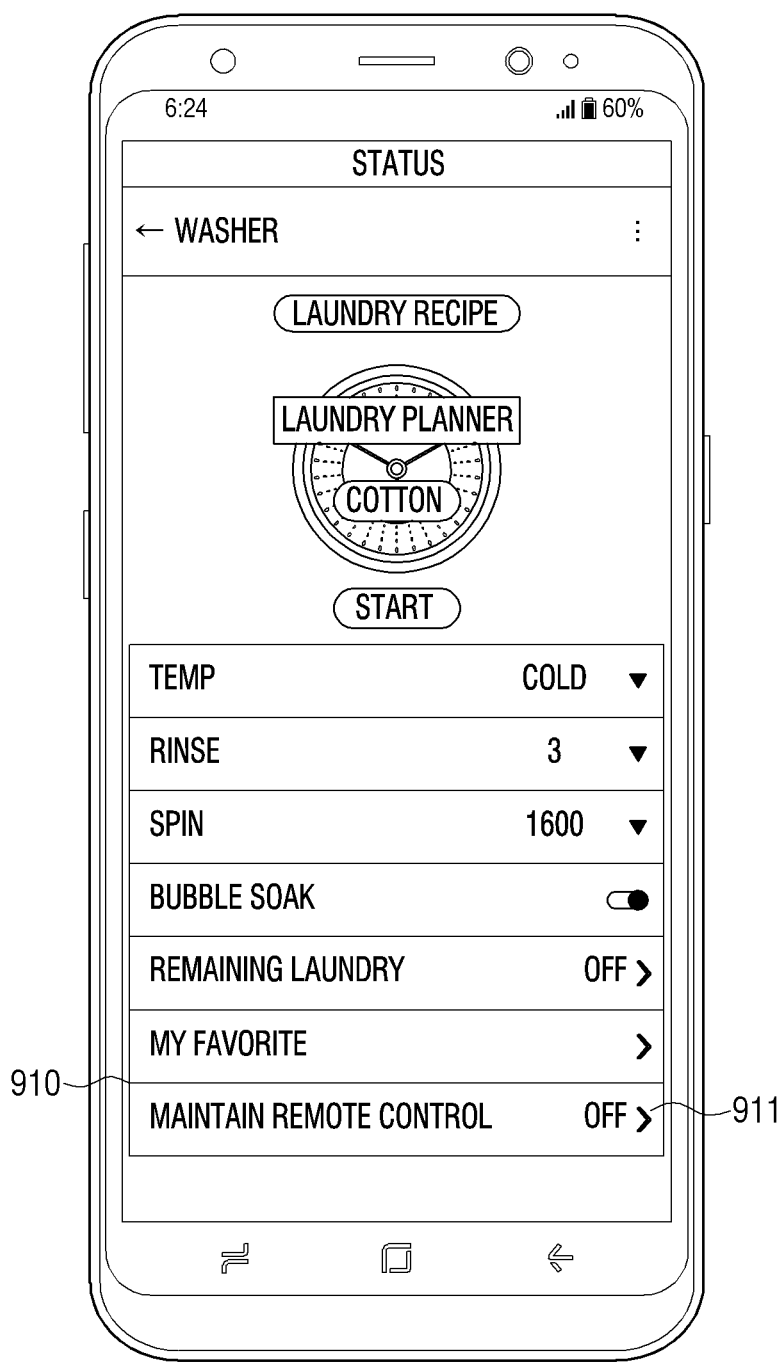
FIGS. 9A, 9B, and 9C are diagrams illustrating a UI screen according to various embodiments of the disclosure.
Figure 9B:
Figure 9C:
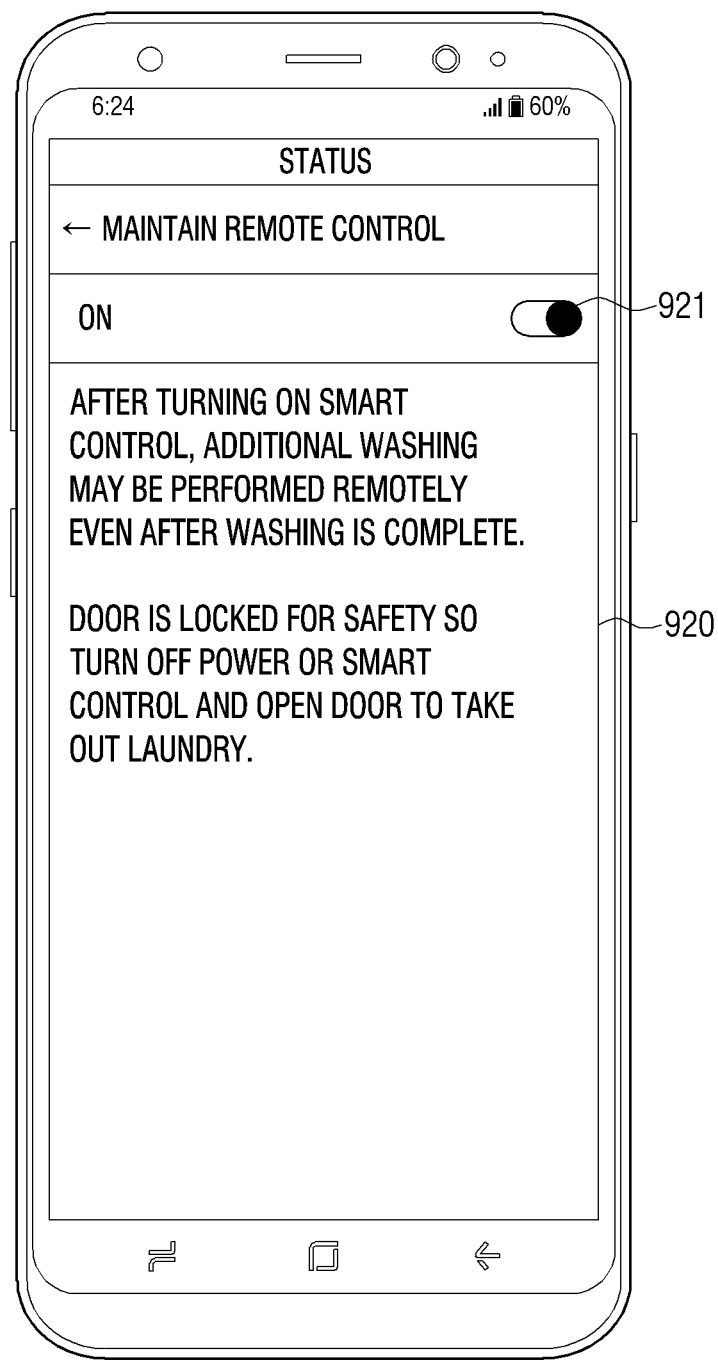

FIGS. 9A, 9B, and 9C are diagrams illustrating a UI screen according to various embodiments of the disclosure.

Referring to FIGS. 9A to 9C, the processor 140 may be configured to provide a UI screen for remote control managing.

The processor 140 according to an example may provide a UI screen 910 which includes an item 911 for setting whether to maintain remote control of the washing machine as shown in FIG. 9A. Based on the item 911 for setting whether to maintain remote control being selected from the corresponding UI screen 910, a UI screen 920 which includes a control item 921 for turning ON or OFF the maintain remote control may be provided as shown in FIG. 9B. Based on the maintain remote control being set to "ON" through the corresponding control item 921 as shown in FIG. 9C, the remote control of the device may be maintained regardless of completing the cycle of the washing machine.

Figure 10:
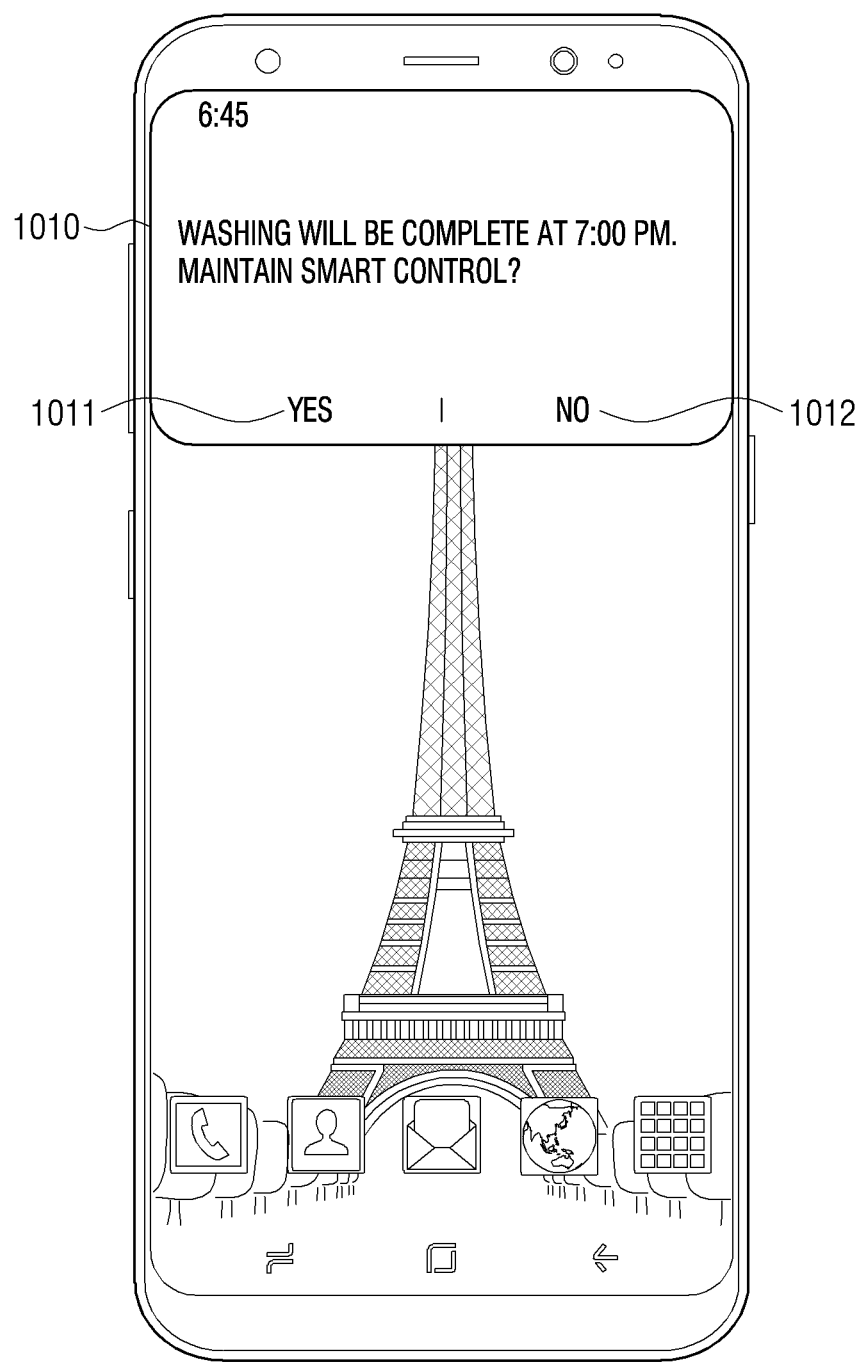
FIG. 10 is a diagram illustrating a UI screen according to an embodiment of the disclosure.

FIG. 10 is a diagram illustrating a UI screen according to an embodiment of the disclosure.

Referring to FIG. 10, the processor 140 may be configured to provide a UI screen for selecting whether to maintain remote control N minutes before the time point at which the washing is complete. For example, the processor 140 may be configured to provide a UI screen 1010 which includes a message asking whether to maintain smart control while informing of the time point at which washing is complete and items 1011 and 1012 for selecting whether to maintain smart control as shown in FIG. 10.

Figure 11:
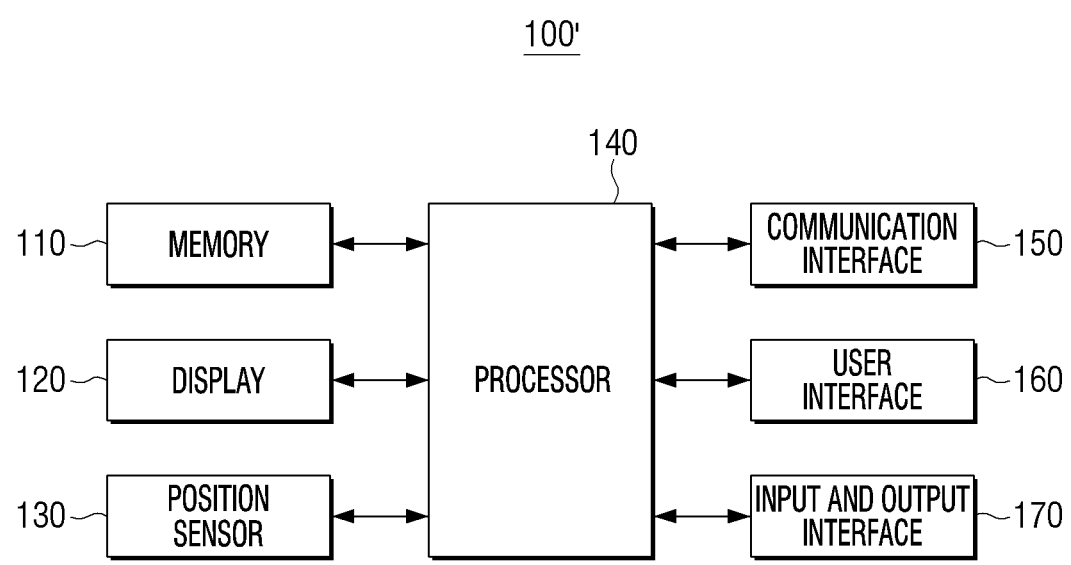
FIG. 11 is a diagram illustrating an example embodiment of a user terminal according to an embodiment of the disclosure.

FIG. 11 is a diagram illustrating an example embodiment of a user terminal according to an embodiment of the disclosure.

Referring to FIG. 11, a user terminal 100' may include the memory 110, the display 120, the position sensor 130, the processor 140, a communication interface 150, a user interface 160, and an input and output interface 170. Detailed descriptions of configurations which overlap with the configurations shown in FIG. 2 from among the configurations shown in FIG. 11 may be omitted.

The memory 110 may be configured to store various modules for operating the user terminal 100. For example, the memory 110 may be stored with a software which includes a base module, a sensing module, a communication module, a presentation module, a web browser module, and a service module. At this time, the base module may be a basic module which processes signals transmitted from each hardware included in the user terminal 100 and transmits the processed signals to an upper layer module. The sensing module may be a module which collects information from the various sensors and analyzes and manages the collected information, and may include a facial recognition module, a voice recognition module, a motion recognition module, a near field communication (NFC) recognition module, and the like. The presentation module may be a module for configuring a display screen, and may include a multimedia module for outputting by playing back multimedia content and a UI rendering module performing UI and graphics processing. The communication module may be a module for performing communication with the outside. The web browser module may mean a module which accesses a web server by performing web browsing. The service module may be a module including various applications to provide various services.

The processor 140 may be configured to perform a graphics processing function (video processing function). For example, the processor 140 may be configured to generate a screen which includes various objects such as an icon, an image, and a text by using a processing part (not shown) and a rendering part (not shown). Here, the processing part (not shown) may process attribute values such as coordinate values, forms, sizes, and colors of each of the objects to be displayed according to a layout of the screen based on the received control command. Further, the rendering part (not shown) may be configured to generate screens of various layouts which include objects based on the attribute values processed from the processing part (not shown).

The processor 140 may be configured to perform processing of audio data. Specifically, the processor 140 may be configured to perform various processing such as decoding, amplifying, or noise filtering of the audio data.

The communication interface 150 may be configured to perform communication with a network device (not shown).

The communication interface 150 according to an embodiment may include a wireless communication module configured to perform communication with the access point (AP) device 40 (FIG. 1). For example, the communication interface 150 may include a wireless communication module, for example, a Wi-Fi module. That is, the communication network between the AP device 40 and the user terminal 100 may be a Wi-Fi network, but is not limited thereto. The Wi-Fi module may be configured to perform communication according to at least one standard version from among 802.11a, 802.11b, 802.11g, 802.11n, and 802.11ac, but is not limited thereto, and new versions developed later may be included.

However, the embodiment is not limited thereto, and the communication interface 150 may be configured to perform communication according to various wireless communication standards such as, for example, and without limitation, Zigbee, 3rd Generation (3G), 3rd Generation Partnership Project (3GPP), Long Term Evolution (LTE), LTE Advanced (LTE-A), 4th Generation (4G), 5th Generation (5G), and the like, Infrared Data Association (IrDA) technology, and the like in addition to the above-described communication method.

The user interface 160 may be implemented as a device such as a button, a touch pad, a mouse and a keyboard, or implemented also as a touch screen capable of performing the above-described display function and the operation input function together therewith. Here, the button may be a button of various types such as a mechanical button which is formed at a random area at a front surface part or a side surface part, a rear surface part, or the like of an exterior of a main body of the user terminal 100, a touch pad, or a wheel.

The input and output interface 170 may be an interface of any one from among a high definition multimedia interface (HDMI), a mobile high-definition link (MHL), a universal serial bus (USB), a display port (DP), Thunderbolt, a video graphics array (VGA), an RGB port, a D-subminiature (D-SUB), or a digital visual interface (DVI). The input and output interface 170 may be configured to input and output at least one from among an audio signal and a video signal.

In addition, the user terminal 100' may further include a speaker (not shown). The speaker (not shown) may be an element configured to output not only various audio data processed from the input and output interface 170, but also various notification sounds, voice messages, or the like. The processor 140 may be configured to control the speaker (not shown) to output information corresponding to the UI screens according to the various embodiments of the disclosure to an audio form.

The user terminal 100' may further include a microphone (not shown). The microphone may be a configuration for receiving the user voice or other sounds and converting to audio data. For example, the user command input on the UI screens according to the various embodiments of the disclosure may be input in a form of a voice command.

Figure 12:
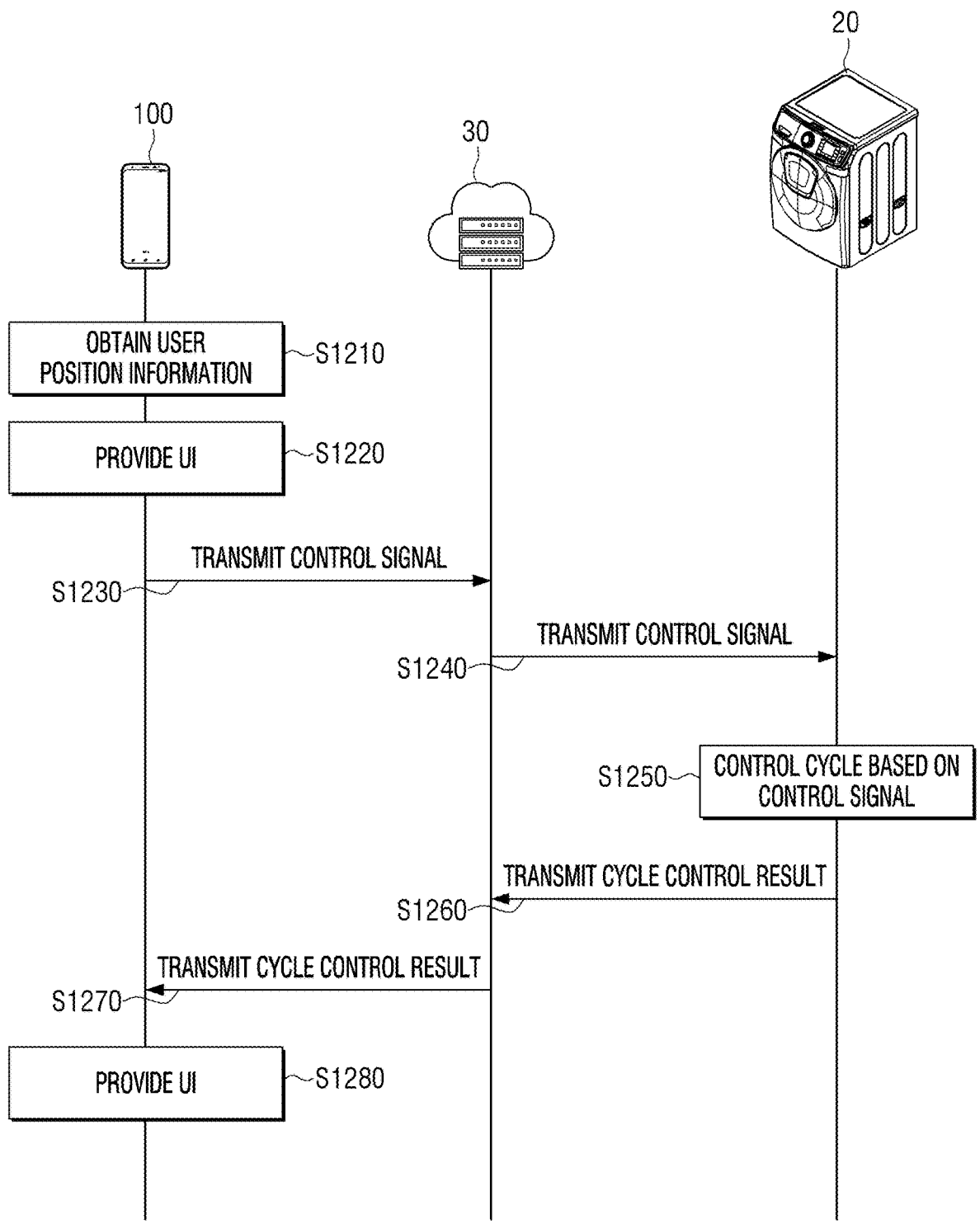
FIG. 12 is a sequence diagram illustrating an operation of an electronic system according to an embodiment of the disclosure.

FIG. 12 is a sequence diagram illustrating an operation of an electronic system according to an embodiment of the disclosure.

Referring to FIG. 12, the user terminal 100 may obtain the user position information based on the position information of the user terminal 100 in operation S1210. The user terminal 100 according to an example may be configured to obtain the position information of the user terminal 100 a predetermined time before the preset cycle of the washing machine is progressed or a predetermined time before the cycle currently in progress is completed.

Then, the user terminal 100 may provide a UI for controlling the corresponding cycle based on the obtained user position information and preset cycle time, an estimated completion time of the cycle in progress, and the like in operation S1220. According to an example, a UI as shown in FIGS. 7A to 7D described above may be provided.

Then, the user terminal 100 may transmit, based on the user command being input through the UI provided in operation S1220, a control signal corresponding to the user command to the server 30 in operation 51230. According to an example, a control signal to delay the preset cycle time, and a control signal for an additional cycle to be performed after the completion of the cycle in progress may be transmitted to the server 30.

The server 30 may transmit the control signal received from the user terminal 100 to the washing machine 20 in operation S1240. Alternatively, the server 30 may control the washing machine 20 based on the control signal received from the user terminal 100.

The washing machine 20 may control a preset cycle or a cycle in progress based on the control signal received from the server 30 in operation S1250. According to an example, the washing machine 20 may delay the preset cycle time or perform an additional cycle after the cycle in progress is completed. In addition, the washing machine 20 may transmit, based on the cycle being controlled according to the control signal, a cycle control result to the server 30 in operation S1260. In addition, the server 30 which received the cycle control result may transmit the corresponding information to the user terminal 100 in operation S1270.

The user terminal 100 may provide, based on the cycle control result of the washing machine 20 being received from the server 30, a UI corresponding to the relevant information in operation S1280. According to an example, the washing machine 20 may provide a UI showing that the preset cycle time is changed or a UI showing that the additional cycle is to be performed after completing the cycle in progress.

Figure 13:
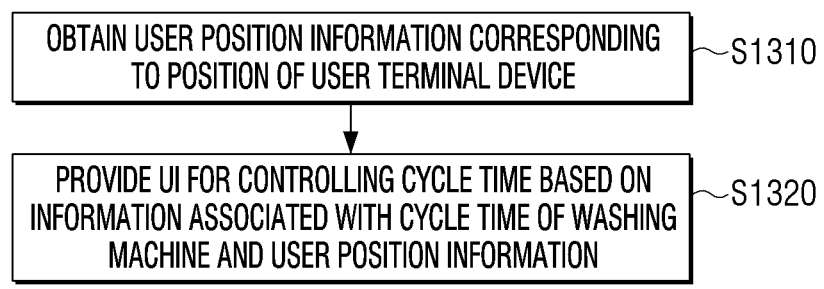
FIG. 13 is a flowchart illustrating a control method of a user terminal according to an embodiment of the disclosure.

FIG. 13 is a flowchart illustrating a control method of a user terminal according to an embodiment of the disclosure.

Referring to FIG. 13, according to the control method of the user terminal which controls the washing machine by executing the application, first, the user position information corresponding to the position of the user terminal 100 sensed by the position sensor may be obtained in operation S1310.

Then, a UI for controlling the cycle time of the washing machine may be provided in an execution screen of an application based on information associated with the cycle time of the washing machine 20 and the user position information in operation S1320.

In this case, in operation S1320, a UI asking whether to change the preset cycle time of the washing machine may be provided based on the preset cycle time of the washing machine and the user position information.

In addition, in operation S1320, a UI asking whether to perform an additional cycle may be provided in the washing machine based on the remaining cycle time of the washing machine and the user position information.

In addition, the control method may further include providing a UI which includes the plurality of lifestyle items and controlling, based on one from among the plurality of lifestyle items being selected, the washing machine to automatically set a washing course corresponding to the selected item.

In addition, the control method may further include providing a UI for editing the washing course automatically set according to the selected lifestyle.

In addition, the control method may further include providing a UI which includes the number of washing cycles, the amount of detergent used when washing, and the remaining amount of detergent based on the current amount of detergent received from the washing machine, and providing, based on the remaining amount of detergent reaching below the threshold value, a UI which guides the purchase of detergent.

Here, the UI which guides the purchase of detergent may include link information to the detergent purchasing website. In this case, the control method may further include providing a UI which updates the remaining amount of detergent based on the detergent purchase information received from the detergent purchasing website and includes information on the updated amount of detergent.

In addition, the control method may further include providing a UI which includes an item for setting whether to maintain remote control of the washing machine and maintaining, based on being set to maintain remote control on the UI, the remote control of the washing machine regardless of completing the cycle of the washing machine.

In addition, the control method may further include providing, based on identifying that the amount of detergent remaining in the automatic detergent dispenser provided in the washing machine is less than or equal to the threshold value and that cleaning of the automatic detergent dispenser is necessary, a UI which guides the insertion of detergent and the cleaning of the automatic detergent dispenser.

According to various embodiments described above, because a UI screen capable of controlling the washing machine is provided taking into consideration the user position and the cycle progress status (or a preset cycle time) of the washing machine (or, drying machine), user convenience may be enhanced. In addition, because various guides associated with the control of the washing machine are provided, user convenience may be enhanced.

The methods according to the various embodiments described above may be implemented in an application form installable in an existing electronic device.

In addition, the methods according to the various embodiments described above may be implemented with only a software upgrade or a hardware upgrade of an existing electronic device.

In addition, the various embodiments described above may be performed through an embedded server provided in an electronic device, or at least one external server from among the electronic devices.

According to an embodiment, the various embodiments described above may be implemented with software including instructions stored in a machine-readable storage media (e.g., computer). The machine may call an instruction stored in the storage medium, and as a device capable of operating according to the called instruction, may include an electronic device (e.g., electronic device (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Here, 'non-transitory' merely means that the device is tangible and does not include a signal (e.g., electromagnetic waves), and the term does not differentiate data being semi-permanently stored or being temporarily stored in the storage medium. For example, the 'non-transitory storage medium' may include a buffer in which data is temporarily stored.

According to an embodiment, a method according to the various embodiments described may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online (e.g., downloaded or uploaded) through an application store (e.g., PLAYSTORE™) or directly between two user devices (e.g., smartphones). In the case of online distribution, at least a portion of the computer program product (e.g., downloadable app) may be at least stored temporarily in a storage medium readable by a device such as a server of a manufacturer, a server of an application store, or a memory of a relay server, or temporarily generated.

Each of the elements (e.g., a module or a program) according to the various embodiments described above may be configured as a single entity or a plurality of entities, and some sub-elements of the abovementioned sub-elements may be omitted, or other sub-elements may be further included in the various embodiments. Alternatively or additionally, some elements (e.g., modules or programs) may be integrated into one entity to perform the same or similar functions performed by the respective elements prior to integration. Operations performed by a module, a program, or another element, in accordance with various embodiments, may be performed sequentially, in a parallel, repetitively, or in a heuristic manner, or at least some operations may be executed in a different order, omitted or a different operation may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user terminal for controlling a washing machine by executing an application, the user terminal comprising:
    memory storing therein the application;
    a display;
    a communication module;
    a position sensor; and
    a processor configured to:
        obtain, by executing the application, user position information corresponding to a position of the user terminal sensed by the position sensor,
        control the display to provide a user interface (UI) for controlling a cycle time of a washing machine based on information associated with the cycle time of the washing machine and the user position information,
        obtain the position information of the user terminal before a predetermined time prior to a start time of a preset cycle of the washing machine,
        determine a time of arrival of the user arriving at a location where the washing machine is positioned,
        upon determining that the time of arrival of the user is late by a threshold time or more than a completion time of the preset cycle of the washing machine, control the display to display a first UI asking whether to change the completion time of the preset cycle of the washing machine,
        based on a user command for changing the completion time of the preset cycle of the washing machine being input through the first UI, control the communication module to transmit a control signal corresponding to the user command to the washing machine, and
        maintain remote control of the washing machine regardless of completing the preset cycle of the washing machine,
    wherein the first UI includes information guiding to change the completion time of the preset cycle of the washing machine and an item for changing the completion time of the preset cycle of the washing machine.

2. The user terminal of claim 1, wherein the processor is configured further to control the display to provide a UI asking whether to perform an additional cycle in the washing machine based on a remaining cycle time of the washing machine and the user position information.

3. The user terminal of claim 1, wherein the processor is further configured to:
    control the display to provide a UI which comprises a plurality of user setting items, and
    control, based on an item from among the plurality of user setting items being selected, the washing machine to automatically set a washing course corresponding to the selected item.

4. The user terminal of claim 3, wherein the processor is further configured to control the display to provide a UI for editing the washing course.

5. The user terminal of claim 1, wherein the processor is further configured to control the display to provide a UI which comprises a remaining amount of detergent based on a number of washing cycles, an amount of detergent used when washing, and a current amount of detergent received from the washing machine.

6. The user terminal of claim 5, wherein the processor is further configured to control, based on the remaining amount of detergent reaching below a threshold value, the display to provide a UI which guides a purchase of detergent.

7. The user terminal of claim 6,
    wherein the UI which guides the purchase of detergent comprises link information to a detergent purchasing website, and
    wherein the processor is further configured to update the remaining amount of detergent based on detergent purchase information received from the detergent purchasing website.

8. The user terminal of claim 1, wherein the processor is further configured to:
    control the display to provide a UI which comprises an item for setting whether to maintain remote control of the washing machine, and
    maintain, based on being set to maintain the remote control on the UI, the remote control of the washing machine regardless of completing the preset cycle of the washing machine.

9. The user terminal of claim 1, wherein the processor is further configured to control, based on identifying that an amount of detergent remaining in an automatic detergent dispenser provided in the washing machine is less than or equal to a threshold value and a cleaning of the automatic detergent dispenser is necessary, the display to provide a UI which guides an insertion of detergent and the cleaning of the automatic detergent dispenser.

10. A control method of a user terminal controlling a washing machine by executing an application, the control method comprising:
    obtaining user position information corresponding to a position of the user terminal sensed by a position sensor;
    providing a user interface (UI) for controlling a cycle time of the washing machine in an execution screen of the application based on information associated with the cycle time of the washing machine and the user position information;
    obtaining the position information of the user terminal before a predetermined time prior to a start time of a preset cycle of the washing machine;
    determining a time of arrival of the user arriving at a location where the washing machine is positioned;
    upon determining that the time of arrival of the user is late by a threshold time or more than a completion time of the preset cycle of the washing machine, displaying a first UI asking whether to change the completion time of the preset cycle of the washing machine;
    based on a user command for changing the completion time of the preset cycle of the washing machine being input through the first UI, transmitting a control signal corresponding to the user command to the washing machine; and maintaining remote control of the washing machine regardless of completing the preset cycle of the washing machine, wherein the first UI includes information guiding to change the completion time of the preset cycle of the washing machine and an item for changing the completion time of the preset cycle of the washing machine.

11. The method of claim 10, wherein the providing of the UI comprises providing a UI asking whether to perform an additional cycle in the washing machine based on a remaining cycle time of the washing machine and the user position information.

12. The method of claim 10, wherein a UI comprising a plurality of user setting items is provided, and wherein the method further comprises controlling, based on an item from among the plurality of user setting items being selected, the washing machine to automatically set a washing course corresponding to the selected item.

13. The method of claim 12, further comprising: providing a UI for editing the washing course.

14. The method of claim 10, further comprising: providing a UI which comprises a remaining amount of detergent based on a number of washing cycles, an amount of detergent used when washing, and a current amount of detergent received from the washing machine.

15. The method of claim 10, further comprising: providing a UI which guides a purchase of detergent based on the remaining amount of detergent reaching below a threshold value.

16. The method of claim 15, further comprising:

wherein the UI which guides the purchase of detergent comprises link information to a detergent purchasing website, and wherein the method further comprises updating, based on detergent purchase information received from the detergent purchasing website, the remaining amount of detergent and providing a UI comprising the updated information related to the remaining amount of detergent.

17. The method of claim 10, further comprising:

providing a UI which comprises an item for setting whether to maintain remote control of the washing machine; and maintaining, based on being set to maintain the remote control on the UI, the remote control of the washing machine regardless of completing a cycle of the washing machine.

18. The method of claim 10, further comprising:

providing a UI which guides an insertion of detergent and a cleaning of an automatic detergent dispenser based on identifying that an amount of detergent remaining in an automatic detergent dispenser provided in the washing machine is less than or equal to a threshold value and a cleaning of the automatic detergent dispenser is necessary.

* * * * *